United States Patent
Lee et al.

(10) Patent No.: US 10,498,441 B2
(45) Date of Patent: *Dec. 3, 2019

(54) SYSTEM AND METHOD FOR ABSTRACTING WAVELENGTH-SWITCHED OPTICAL NETWORK TRAFFIC ENGINEERING TOPOLOGY IN SDN CONTROL HIERARCHY

(71) Applicant: Futurewei Technologies, Inc., Plano, TX (US)

(72) Inventors: Young Lee, Plano, TX (US); Yufei Wang, Holmdel, NJ (US); Wei Wang, Beijing (CN); Haomian Zheng, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,414

(22) Filed: Apr. 2, 2018

(65) Prior Publication Data

US 2018/0234178 A1    Aug. 16, 2018

Related U.S. Application Data

(63) Continuation of application No. 15/382,242, filed on Dec. 16, 2016, now Pat. No. 9,954,611.

(51) Int. Cl.
| | |
|---|---|
| *H04J 14/02* | (2006.01) |
| *H04B 10/079* | (2013.01) |
| *H04L 12/24* | (2006.01) |
| *H04L 12/727* | (2013.01) |
| *H04L 12/715* | (2013.01) |

(52) U.S. Cl.
CPC .... *H04B 10/07957* (2013.01); *H04J 14/0227* (2013.01); *H04L 41/12* (2013.01); *H04L 41/20* (2013.01); *H04L 45/121* (2013.01); *H04L 45/64* (2013.01)

(58) Field of Classification Search
CPC . H04J 14/0227; H04J 14/0256; H04J 14/0261
See application file for complete search history.

(56) References Cited

U.S. PATENT DOCUMENTS

| | | |
|---|---|---|
| 2011/0170416 A1 | 7/2011 | Schwager et al. |
| 2013/0051788 A1 | 2/2013 | Marcenaro et al. |
| | (Continued) | |

FOREIGN PATENT DOCUMENTS

| | | |
|---|---|---|
| CN | 104717098 A | 6/2015 |
| CN | 106209623 A | 12/2016 |
| | (Continued) | |

OTHER PUBLICATIONS

Machine Translation and Abstract of Chinese Publication No. CN104717098, Jun. 17, 2015, 33 pages.

(Continued)

*Primary Examiner* — Shi K Li
(74) *Attorney, Agent, or Firm* — Conley Rose, P.C.

(57) ABSTRACT

A method including determining how many optical channel (OCh) paths are available for border node pair connections; determining which of the OCh paths satisfy a preselected latency threshold; and reporting the OCh paths that satisfy the preselected latency threshold to a service coordinator.

20 Claims, 15 Drawing Sheets

(56) References Cited

U.S. PATENT DOCUMENTS

| | | | |
|---|---|---|---|
| 2013/0202299 A1 | 8/2013 | Prakash et al. | |
| 2013/0250770 A1 | 9/2013 | Zou et al. | |
| 2014/0099119 A1 | 4/2014 | Wei et al. | |
| 2014/0328214 A1* | 11/2014 | Iovanna | H04L 41/12 370/254 |
| 2015/0200838 A1 | 7/2015 | Nadeau et al. | |
| 2015/0296279 A1 | 10/2015 | Bouda | |
| 2016/0344618 A1* | 11/2016 | Oprea | H04L 45/40 |
| 2018/0278520 A1* | 9/2018 | Fiaschi | H04L 45/64 |

FOREIGN PATENT DOCUMENTS

| | | |
|---|---|---|
| EP | 2476224 A1 | 7/2012 |
| WO | 2011031207 A1 | 3/2011 |

OTHER PUBLICATIONS

Machine Translation and Abstract of Chinese Publication No. CN106209623, Dec. 7, 2016, 46 pages.
Foreign Communication From a Counterpart Application, PCT Application No. PCT/CN2017/106723, International Search Report dated Jan. 19, 2018, 7 pages.
Foreign Communication From a Counterpart Application, PCT Application No. PCT/CN2017/106723, Written Opinion dated Jan. 19, 2018, 4 pages.
Notice of Allowance dated Dec. 13, 2017, 10 pages, U.S. Appl. No. 15/382,242, filed Dec. 16, 2016.
Foreign Communication From A Counterpart Application, Chinese Application No. 17881705.2, Extended European Search Report dated Oct. 8, 2019, 8 pages.

\* cited by examiner

SYSTEM AND METHOD FOR ABSTRACTING WAVELENGTH-SWITCHED OPTICAL NETWORK TRAFFIC ENGINEERING TOPOLOGY IN SDN CONTROL HIERARCHY

CROSS-REFERENCE TO RELATED APPLICATIONS

This patent application is a continuation of co-pending U.S. patent application Ser. No. 15/382,242 filed Dec. 16, 2016, by Y. Lee, et al., and titled "System and Method For Abstracting Wavelength-Switched Optical Network Traffic Engineering Topology in SDN Control Hierarchy," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a networking paradigm that decouples network control and forwarding functions. The decoupling of the control plane from the data plane allows for centralization of network control, enabling effective policy administration and flexible management. The centralization of network control facilitates various network functionalities, such as network measurements, traffic engineering, enhanced quality of services, and enhanced access control. With the growing availability of SDN-enabled nodes and protocols, many organizations have started deploying SDN networks.

SUMMARY

In an SDN network comprising a multiplicity of network domains, a multi-domain Service Coordinator (MDSC), which may also be referred to as a supercontroller, determines routes through the network. In particular, the MDSC services requests for network capacity, and to service such requests, the MDSC needs to be able to compute an end-to-end path through the network. In the SDN network, the network domains need not be homogeneous, and may include one or more packet domains and one or more optical domains. Maintaining a network topology for each domain falls to an SDN controller for each of the network domains which maintains a traffic engineering database (TED) comprising network topology information for its respective network domain. Maintaining a TED of the network topology by the MDSC for all of the network domains in its SDN is prohibitive. Thus, an abstraction of the network topology for each of the network domains is provided to the MDSC. A system and method for abstracting the topology of a wavelength-switched optical network (WSON) in an SDN environment is disclosed.

In an embodiment, the disclosure includes a method including determining for each reachable source-destination (S-D) node pair, a maximal number of optical channel (OCh) paths available for source-destination node pair connections. The disclosure further includes determining, if a preselected latency threshold is specified, for all available OCh paths a maximal number of paths satisfying the preselected latency threshold and reporting the available OCh paths to an MDSC. In an embodiment the method further determines, for each reachable source-destination node pair, a maximal number of OCh paths available for source-destination connections comprising determining, for all wavelengths of a preselected set of optical wavelengths for optical multiplex section (OMS) links, whether a wavelength of the set of preselected optical wavelengths is available for a source-destination node pair connection, and including the OMS link in a lambda plane for the wavelength when the wavelength is available. In an embodiment the method further comprises determining the maximal flow between the source-destination node pair based on lambda planes. In an embodiment, the method further comprises calculating the maximal flow comprises summing the number of OCh paths in each lambda plane across all lambda planes. In an embodiment, the maximal flow for each lambda plane comprises a number of OCh paths in the lambda plane. In an embodiment, the method further comprises converting the maximal flow to a bandwidth equivalent coding. In an embodiment, the method further comprises sending the bandwidth equivalent coding to a northbound interface (NBI). In an embodiment, the reporting the available OCh paths further comprises determining a maximum number of OCh paths available for source-destination node connections for a current source-destination node pair, and reporting the maximum number to the MDSC when the reporting to the MDSC is sequential. In an embodiment, reporting the available OCh paths further comprises reporting the maximum number of OCh paths available for source-destination node connections for all reachable source-destination node pairs when the reporting is not sequential. In an embodiment, the method is in response to a pull mode request from the MDSC, wherein the pull mode request comprises a specified set of source-destination node pairs. In an embodiment, the method is in response to an update of a network topology maintained in a TED. In an embodiment, when the preselected latency threshold is specified, the determining comprise setting, for each lambda plane, an initial network topology as a maximal flow topology comprising the maximum number of OCh paths available for source-destination node pair connections, determining, for each lambda plane, a shortest path based on a shortest-path algorithm with a delay as a link weight, recording the shortest path when a shortest path length is less than or equal to the preselected latency threshold and removing links of the shortest path from the maximum flow topology. In an embodiment, the method further comprises repeating the setting, determining, recording, and removing steps until the source-destination node pair is no longer connected, and summing a number of paths recorded across all lambda planes, wherein the sum constitutes a maximum bandwidth satisfying a latency constraint comprising the preselected latency threshold. In an embodiment, the method further comprises, when the number of paths is zero for each lambda plane, the following steps: setting, for each lambda plane, the initial topology to an original lambda plane topology, running, for each lambda plane, a shortest path based on a shortest-path algorithm with the preselected latency threshold as a link weight to determine a shortest latency path, incrementing, for each lambda plane when a length of the shortest path is less than the preselected latency threshold, a number of paths by one, removing links on the shortest path, and repeating the determining, incrementing, and removing until the source-destination node pair are no longer connected or the latency of the shortest path is greater than the preselected latency threshold. In an embodiment, a calculation for one of the reachable S-D node pairs does not affect a wavelength availability for another of the reachable S-D node pairs.

In an embodiment, the disclosure includes a method including determining, for all wavelengths of a preselected set of optical wavelengths of OMS links, if a wavelength of the set of preselected optical wavelengths is available for a source-destination node pair connection. if the wavelength is available, the OMS link is included in a lambda plane for the wavelength. The disclosure further includes determining, with a delay as a link weight, a shortest path between a source-destination node pair for each lambda plane, and selecting, for all lambda planes with successful shortest path calculations, the shortest path with the smallest total path delay.

In an embodiment, the method further comprises recording the latency of the selected path. In an embodiment, the method further comprises sending the recorded latency to an NBI of an SDN controller. In an embodiment, the recorded latency is send to the NBI in a predetermined field of a type-length-value (TLV) reporting structure. In an embodiment, the recorded latency is sent in response to a pull mode request from an MDSC communicatively coupled to the SDN controller via the NBI.

In an embodiment, the disclosure includes an SDN controller. The SDN controller includes a processor, an NBI comprising one or more ports configured to communicatively couple to an MDSC and a memory coupled to the processor, the memory storing programming instructions comprising a WSON abstraction module. The WSON abstraction module, when executed by the processor cause the processor to communicate, to the MDSC via the NBI, an abstraction of a wavelength-switched optical network coupled to the SDN controller. The WSON abstraction module, when executed by the processor, further causes the processor to generate the abstraction by determining a minimum latency OCh path between a source-destination node pair in response to a request from the MDSC, or determining a maximal number of available OCh paths between each reachable source-destination node pair, or determining a maximal number of OCh paths between each reachable source-destination node pair satisfying a preselected latency threshold condition.

In an embodiment, the WSON abstraction module causes the processor to perform the following steps when determining a maximal number of available OCh paths between each reachable source-destination node pair: determine, for all wavelengths of a preselected set of optical wavelengths for OMS links, whether a wavelength of the set of preselected optical wavelengths is available for a source-destination node pair connection, include the OMS link in a lambda plane for the wavelength when the wavelength is available, and sum the number of OCh paths in each lambda plane across all lambda planes, wherein the maximal number of available OCh paths between each reachable source-destination node pair comprises the sum of the number of OCh paths.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the example designs and implementations illustrated and described herein, but may be modified within the scope of the appended claims along with their full scope of equivalents.

Figure 1:
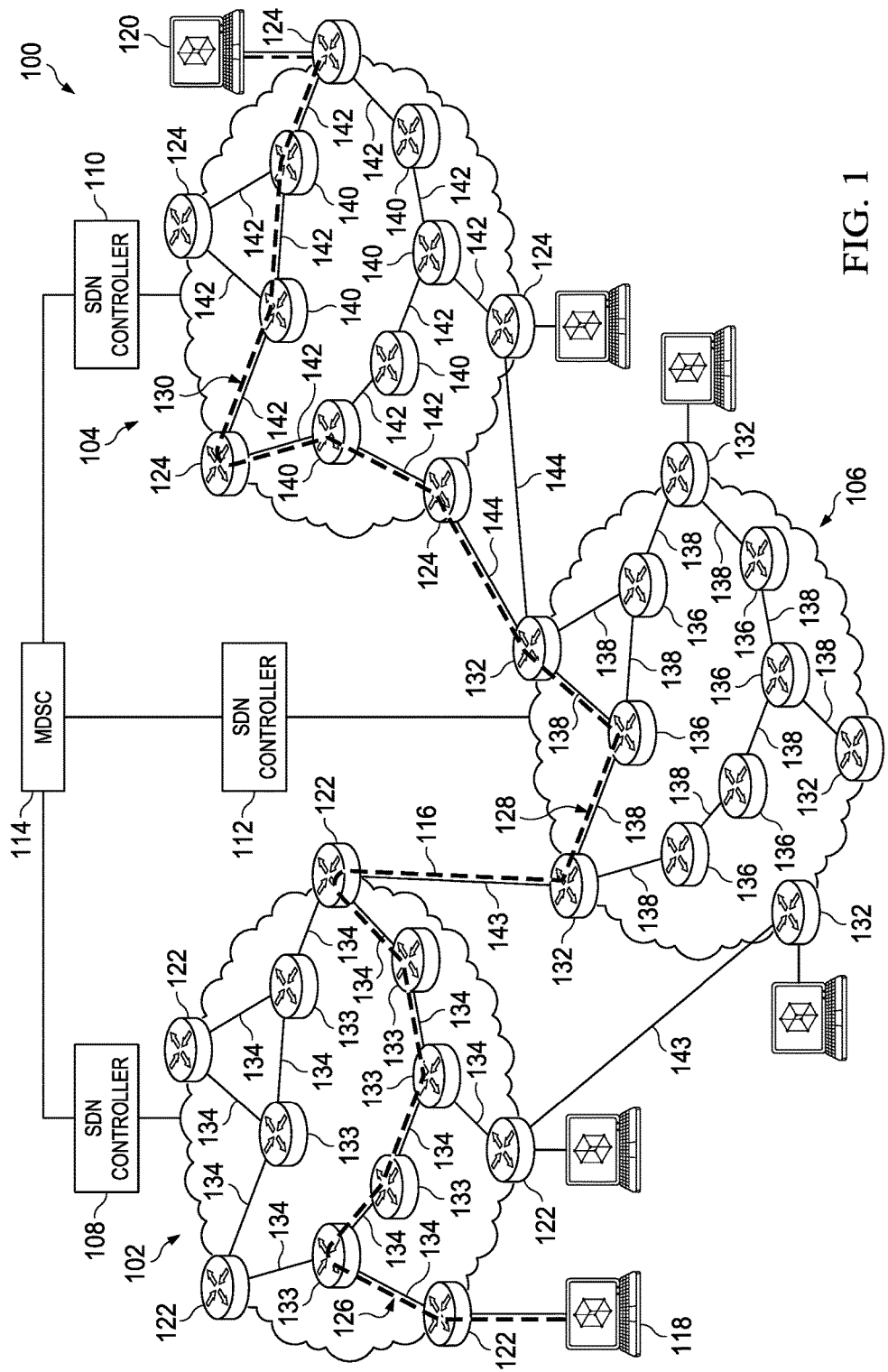
FIG. 1 is a block diagram of an SDN system.

FIG. 1 is a schematic diagram of an example of an SDN system 100. The SDN system 100 comprises, in this example embodiment, three network domains: packet network domains 102 and 104, and an optical network domain 106, and their respective SDN controllers 108, 110 and 112. The underlying infrastructure of packet network domains 102 and 104 comprises an electrical network and the underlying infrastructure of optical network domain 106 comprises a WSON. Each of the network domains 102, 104 and 106 is managed by its respective SDN controller: SDN controllers 108 and 110 for packet network domains 102 and 104, respectively, and optical domain SDN controller 112 for optical network domain 106. Each SDN controller 108, 110, 112 may also be referred to as physical network controller (PNC). Each of the network domains 102, 104 and 106 operate under a single network administrative domain. Each of the corresponding SDN controllers 108-112 is responsible for managing and controlling its respective network domain. The SDN controllers 108-112 are communicatively coupled to an MDSC 114. An MDSC 114 may also be referred to as a supercontroller. Although MDSC will be used herein, it would be understood by those skilled in the art having the benefit of the disclosure that MDSC and supercontroller are synonymous in the context of the disclosure.

Management and control of SDN system 100 is the responsibility of MDSC 114. In particular, in an embodiment of an SDN system 100 employing a label-switched path (LSP) routing protocol, MDSC 114 may be required to compute an end-to-end path between source nodes and destination nodes within the SDN system 100. For example, consider an end-to-end path 116 (shown dashed in FIG. 1) between an endpoint 118 and an endpoint 120. Endpoints 118 and 120 are configured to function as access nodes in their respective networks 102 and 104. Endpoint 118 is connected to an edge node 122 in network domain 102 and endpoint 120 is coupled to an edge node 124 in network domain 104. Endpoints 118 and 120 may also be referred to as S-D node pair, or alternatively, a border node pair. End-to-end path 116 includes a segment 126 that traverses packet network domain 102, a segment 128 that traverses optical network domain 106 and a third segment 130 that traverses packet network domain 104. Although end-to-end path 116 is schematically illustrated as a continuous path, traffic flows through each of the network domains 102-106 between the edge nodes located at a boundary of the network, e.g. edge nodes 122 in packet network 102, edge nodes 132 in optical network domain 106 and edge nodes 124 in packet network 104 via internal nodes and links between the internal nodes. For example, segment 126 in network domain 102 between edge nodes 122 comprises one or more internal nodes 133 and connecting links 134, segment 128 in optical network domain 106 between edge nodes 132, includes internal nodes 136 and links 138, and segment 130 in network domain 104 between edge nodes 124 comprises internal nodes 140 and links 142. The edge nodes 122, 132 and 124, and the internal nodes 133, 136 and 140 are software programmable network devices configured to perform forwarding functions in their respective networks. Edge nodes 122, 132 and 124 may also be configured to provide interconnection points between the packet network domains 102, 104 and optical network domain 106. Between the networks, links 143 connect edge nodes 122 and 132, and links 144 connect edge nodes 132 and edge nodes 124. The MDSC 114 is configured to determine the end-to-end path 116 through each of the network domains 102-106.

Optical network domain 106 presents a particular challenge as the links comprise wavelength-multiplexed optical fibers. Stated otherwise, each link 138 comprises an OMS that carries multiple optical wavelengths. Segment 128 of end-to-end path 116 comprising links 138 is an OCh path that is provisioned across one or more links 138 constituting an OMS link. Each link 138 in segment 128 uses the same optical wavelength. This may be further appreciated by referring to FIG. 2, showing an optical network domain 106 in further detail.

Figure 2:
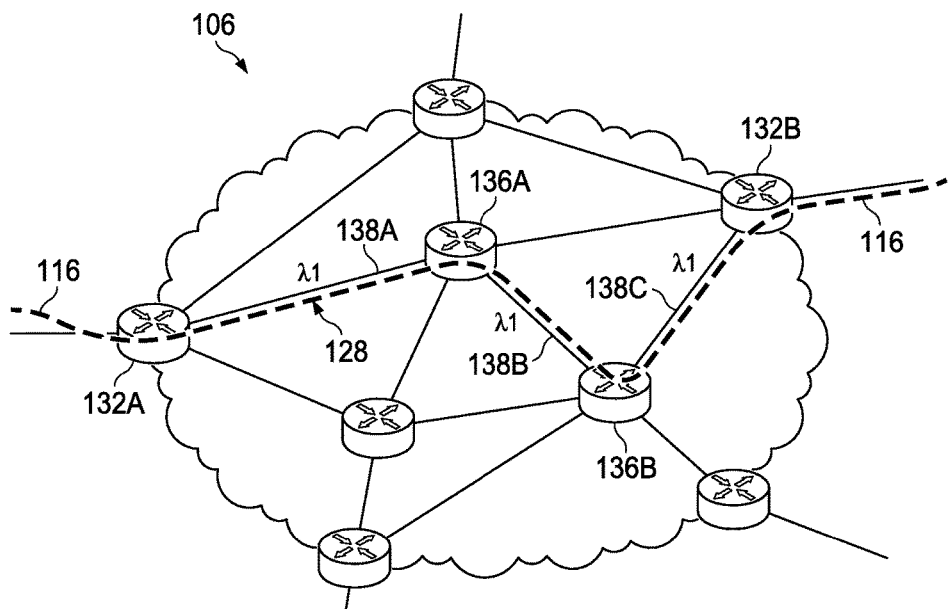
FIG. 2 is a block diagram of an optical network.

FIG. 2 illustrates the optical domain 106 of FIG. 1. In FIG. 2, the example segment 128 of end-to-end path 116 between edge nodes 132A, 132B includes two internal nodes 136A and 136B. Each optical node, such as nodes 136A, 136B comprises a wavelength switch that may add, drop and cross-connect wavelengths. These internal nodes are coupled to edge nodes 132A and 132B by links 138A and 138C, respectively. Link 138B connects internal node 136A and 136B. When an MDSC 114 provisions an end-to-end path in response to a connection request, it finds an end-to-end path wherein the same wavelength is available at each link to be included in the path. This provisioning may also be referred to a routing and wavelength assignment (RWA). Thus in the example in FIG. 2, segment 128 is an OCh path comprising links 138A, 138B, 138C using the same wavelength, $\lambda_1$.

Figure 3:
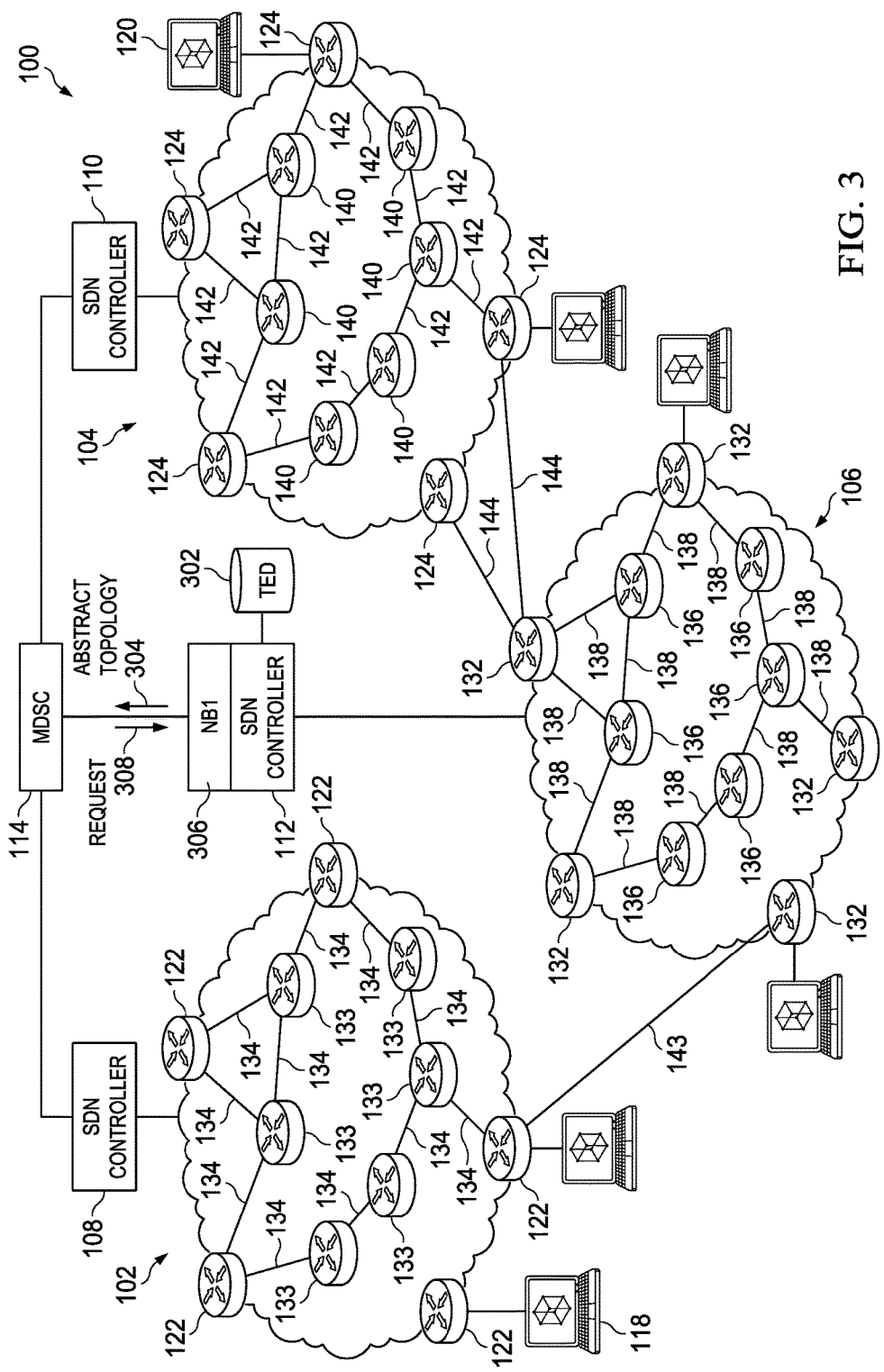
FIG. 3 is a block diagram of an embodiment of an SDN system.

FIG. 3 shows a block diagram of an SDN system 100 similar to the SDN system 100 of FIG. 1. The SDN system 100 of FIG. 3 includes additional details not shown in the SDN system 100 of FIG. 1. An SDN controller 112 associated with optical network domain 106 obtains and/or maintains a full topology view of the optical network domain 106. This full topology view is included in TED 302 coupled to SDN controller 112. TED 302 may be created and/or updated in response to a Path Computation Element Protocol (PCEP) or any other suitable protocol for facilitating communication between an SDN controller 112 and an optical network domain 106. As would be appreciated by those skilled in the art and having the benefit of the disclosure, PCEP may be, in at least some embodiments, an application program interface executed on SDN controller 112. In this respect, the SDN controller 112 may be a virtual machine (VM), a hypervisor, or any other device configured to manage and control the optical network domain 106. Alternatively, in at least some embodiments, TED 302 may be created and/or updated by a Generalized Multi-Protocol Label Switching (GMPLS) protocol which also may be an application program interface executed on SDN controller 112.

To enable an MDSC 114 to calculate an end-to-end path 116 as shown in FIGS. 1-2, an SDN controller 112 could in principle expose the TED 302 to the MDSC 114. However, the sheer amount of data at the domain controller level makes this impractical; at the level of the MDSC 114, the data is too detailed, and such an approach is not scalable. Consequently, as will be described in further detail hereinbelow, an abstract view of the topology of an optical network domain 106, abstract topology 304, is generated, in accordance with the principles of the disclosure, by an SDN controller 112 and communicated to the MDSC 114 through, for example, its NBI 306. NBI 306 may comprise one or more ports communicatively coupled to MDSC 114, as described below in conjunction with FIG. 18. Further, also described below, abstract topology 304 may be provided in response to a request 308 sent from an MDSC 114 to SDN controller 112.

Figure 4:
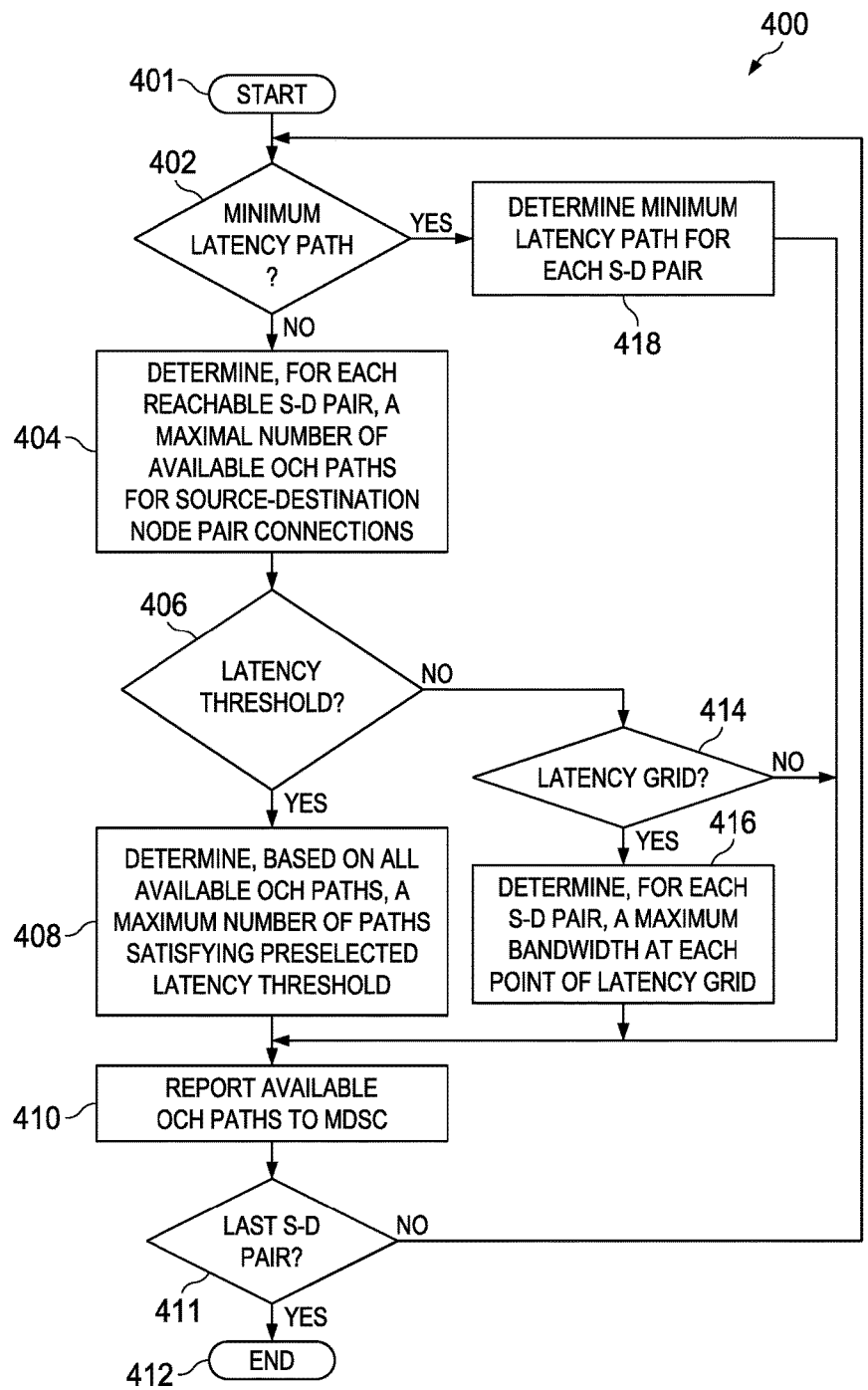
FIG. 4 is a flow chart of an embodiment of a method for generating an abstraction of an optical network domain.

FIG. 4 illustrates a flowchart of a method 400 implemented by, for example, SDN controller 112 in FIGS. 1 and 3 to generate an abstract view of the network topology of an optical network domain, such as optical network domain 106 in FIGS. 1 and 3. Method 400 starts at block 401. In block 402, it is determined if minimum latency paths are to be reported to an MDSC. For example, as described further below, an MDSC such as an MDSC 114 in FIGS. 1 and 3 may pass a request to the SDN controller 112 of FIGS. 1 and 3. The request may include a latency constraint, such as a minimum available latency path, or, as discussed below, a latency threshold not to be exceeded. Alternatively, an SDN controller 112 as shown in FIGS. 1 and 3 may report minimum latency paths based on a policy.

If minimum latency paths are not to be reported, block 402 proceeds by its "No" branch to block 404. In block 404, a maximal number of available OCh paths for source-destination connections is determined for each reachable source-destination node pairs. A source-destination node pair may be unreachable if, for example, a wavelength otherwise available on an OCh path is not available on an ingress link coupling a source to its edge node or on an egress link coupling a destination to its edge node, and the edge nodes do not include a regenerator to convert between wavelengths. Block 404 will be described further below in conjunction with FIG. 5. In block 406 it is determined if a path latency constraint in the form of a latency threshold not to be exceeded is to be satisfied. In other words, in block 406 a determination is made if, for example, in a request from an MDSC or by policy, available paths to be reported are constrained by a preselected latency threshold in which delays on available paths do not exceed a preselected latency threshold.

If a path determination is latency constrained, for example, a preselected latency, threshold is to be satisfied, block 406 exits by the "Yes" branch to block 408. In block 408, a maximal number of OCh paths meeting the latency threshold is determined based on all available OCh paths. Stated otherwise, at block 408, all available OCh paths are pruned to include those available paths that satisfy, i.e. are less than or equal to, the preselected latency threshold. Block 408 will be described in further detail in conjunction with FIG. 8 (comprising sub-figures 8A and 8B) below. In block 410, the available OCh paths, from block 408, are reported to an MDSC 114 in FIGS. 1 and 3. Reporting of available paths may be by a PCEP reply, as described further below, sent to an NBI 306 of an SDN controller 112 in FIG. 3. The structure of reports that may be used in conjunction with block 410, will be described below in conjunction with FIGS. 12 and 13. If a current S-D node pair is not the last reachable S-D node pair, method 400 loops via the "No" branch of block 411 in FIG. 4 over reachable S-D node pairs via a return to block 402 to continue determining available OCh paths.

Figure 5:
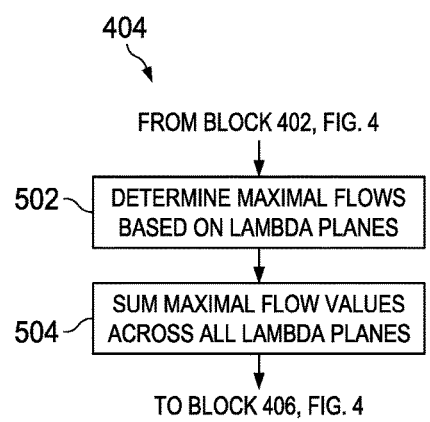
FIG. 5 is a flow chart of a portion of the method of FIG. 4 in further detail.

To further appreciate the principles of the disclosure, block 404 in FIG. 4 is shown in further detail in FIG. 5. To determine a maximal number of available OCh paths in block 404, flows are determined based on lambda planes, in block 502. The concept of a lambda plane is described in conjunction with FIG. 6, and a procedure for determining maximal flows based on lambda planes that may be used in conjunction with block 502 is described in conjunction with FIG. 7. In block 504, the maximal flows for each lambda plane are summed across all lambda planes to yield the maximal flow to be reported in block 410 in FIG. 4.

Figure 6:
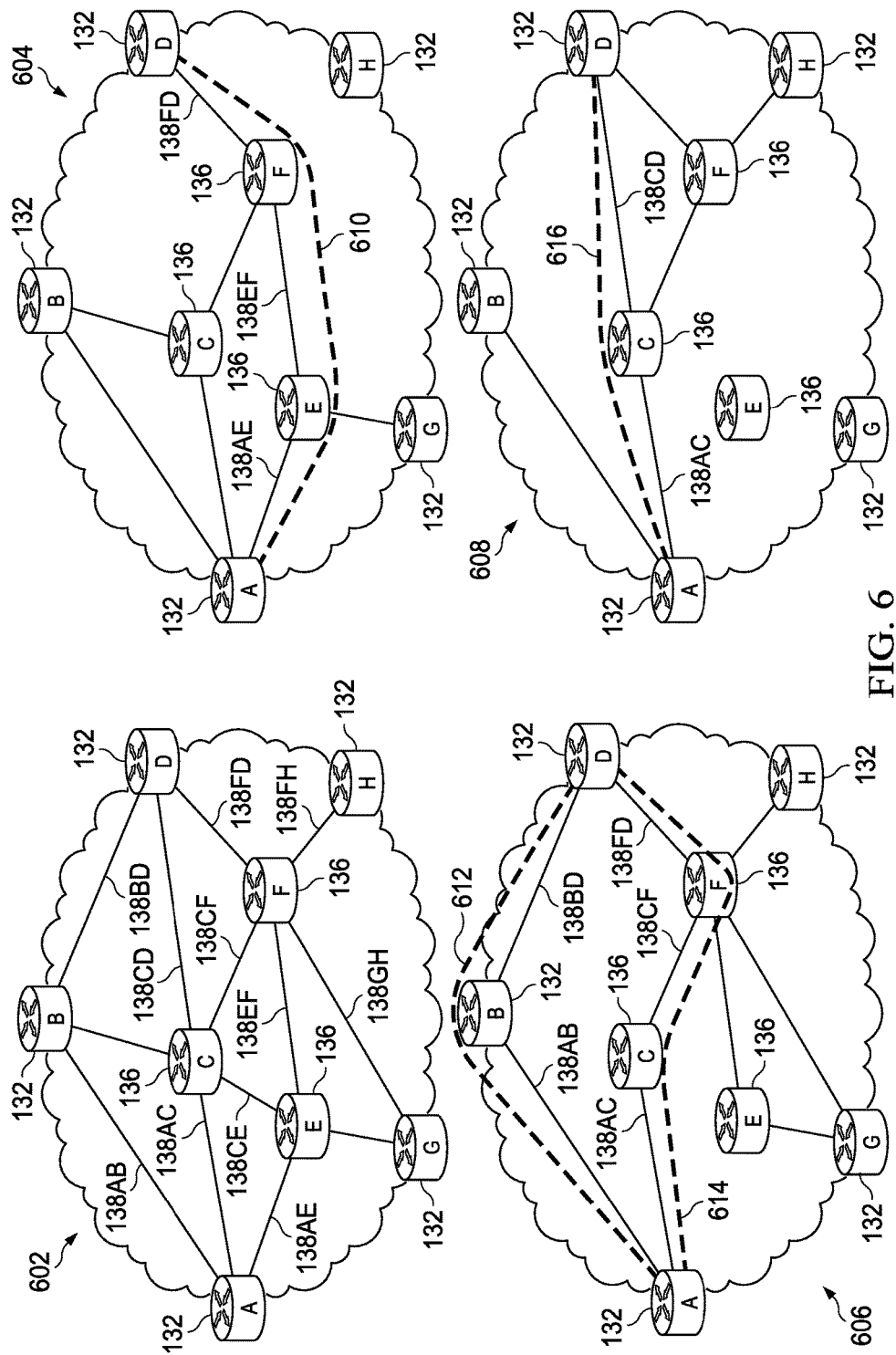
FIG. 6 is a schematic diagram of an embodiment of optical network topologies defining lambda planes.

FIG. 6 shows schematic representations of four optical network topologies 602, 604, 606 and 608. Network topology 602 shows the original network topology comprising four edge nodes 132, labeled A, B, G and H and three internal nodes 136, labeled C, E and F. Network topologies 604-608 are used to introduce the concept of a lambda plane (λ-plane), as used in conjunction with the method described in conjunction with FIG. 7. A λ-plane is defined as a confined optical topology with respect to a given, optical wavelength (λ) value. The example embodiment in FIG. 6, is based on three wavelengths, L1, L2, and L3 (not shown in FIG. 6) for simplicity. It would be appreciated by those skilled in the art having the benefit of the disclosure that typically the set of wavelengths supported on an OMS link comprises many more wavelengths. Network topologies 604, 606, 608 correspond to the wavelengths L1, L2, and L3, respectively. The nodes 132 and 136 are connected by links 138 that comprise OMS links as previously described. Thus, a plurality of optical wavelengths may be transmitted on the links 138 and any of the multiplexed optical wavelengths that are not otherwise committed are available for an end-to-end path between border node pairs (not shown in FIG. 6). The link 138 between nodes A and B is labeled 138AB. Similarly, the link 138 between nodes C and F is labeled 138CF, and so forth. By way of example to illustrate the A-plane, the availability among the three wavelengths, L1, L2, L3, on the various links are as shown in Table 1:

TABLE 1

| Link | Wavelengths |
| --- | --- |
| 138AB | L1, L2, L3 |
| 138AC | L1, L2, L3 |
| 138AE | L1 |
| 138BC | L1 |
| 138BD | L2 |
| 138CD | L3 |
| 138CF | L1, L2, L3 |
| 138CE | None |
| 138DF | L1, L2, L3 |
| 138EF | L1, L2 |
| 138EG | L1, L2 |
| 138FG | L2 |
| 138FH | L2, L3 |

Then, the L1-plane (denoting the λ-plane for wavelength L1) comprises a single OCh path 610, as shown in network topology 604. OCh path 610 constitutes the links 138AE, 138EF and 138FD. Similarly, the L2-plane comprises two OCh paths 612 (including links 138AB, 138BD) and 614 (including links 138AC, 138CF, 138FD) as shown in network topology 606, and the L3-plane comprises a single OCh path 616 (including links 138AC, 138CD) as shown in network topology 608. In topology 604, an alternative path between nodes A, C, F and D is excluded because of the shared link 128FD. Similarly, in topology 608 an alternative path between nodes A, C, F and D is excluded because of the shared link 138AC.

Figure 7:
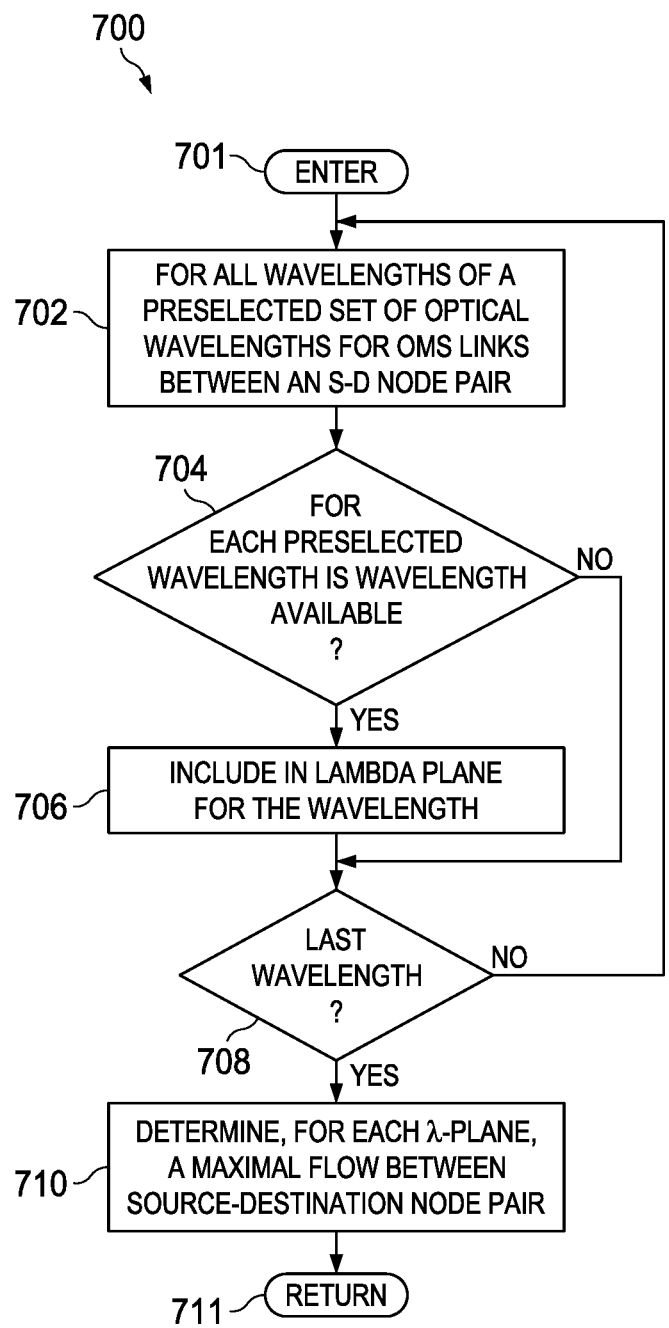
FIG. 7 is a flow chart of an embodiment of a method that can be used in conjunction with the method of FIG. 4.

Referring now to FIG. 7, FIG. 7 shows a flow chart of a method 700 to determine maximal flows based on the lambda plane concept described in conjunction with FIG. 6. In various example embodiments, method 700 may be embodied as a callable software procedure, or as a hardware engine in an application-specific integrated circuit (ASIC) or a field-programmable gate array (FPGA) or similar hardware device. Method 700 enters at block 701. At block 702, a loop is entered over a preselected set of optical wavelengths for OMS links between a S-D pair. In block 704, it is determined if a wavelength in the preselected set wavelength is available. If the particular one of the wavelengths in the preselected set of wavelengths is available, the OMS links are included in a lambda plane for the particular wavelength, in block 706. Method 700 loops, to determine the availability of all wavelengths of the set, via block 708, returning to block 702 via the "No" branch. If, in block 708, when the availability of the last wavelength of the set has been determined and included in the corresponding lambda plane, method 700 breaks out of the loop via the "Yes"

branch of block 708. In block 710, a maximal flow between the source-destination node pair is determined for each lambda plane. In determining a maximal flow, possible paths having a shared link, such link 138FD in topology 604 and 138AC in topology 608 in FIG. 6, contribute a single flow. Method 700 returns at block 711. Considering the example of the lambda planes in FIG. 6 for the network topologies 604, 606 and 608, corresponding to the lambda planes for wavelengths L1, L2 and L3, for wavelength L1, at block 706 the links 138AE, 138EF and 138FD in FIG. 6 are included in the L1-plane and the maximal flow for the L1-plane is 1. For the wavelength L2, there are two trips through the loop and at block 706 the links 138AB, 138BD and 138AC, 138EF, 138FD in FIG. 6 for the L2-plane are added at each trip through the loop. The maximal flow for the L1-plane is 2. For wavelength L3, at block 706, the links 138AC, 138CD in FIG. 6 for the L3-plane are added and the maximal flow for the L3-plane is 1. These may be expressed in terms of a maximal bandwidth by using a predetermined OCh channel bandwidth. For example, if an OCh channel has a bandwidth of 10 gigabits/sec (denoted simply 10 G), the maximal flow for the L2-plane becomes, represented in terms of bandwidth, 20 G.

Figure 8A:
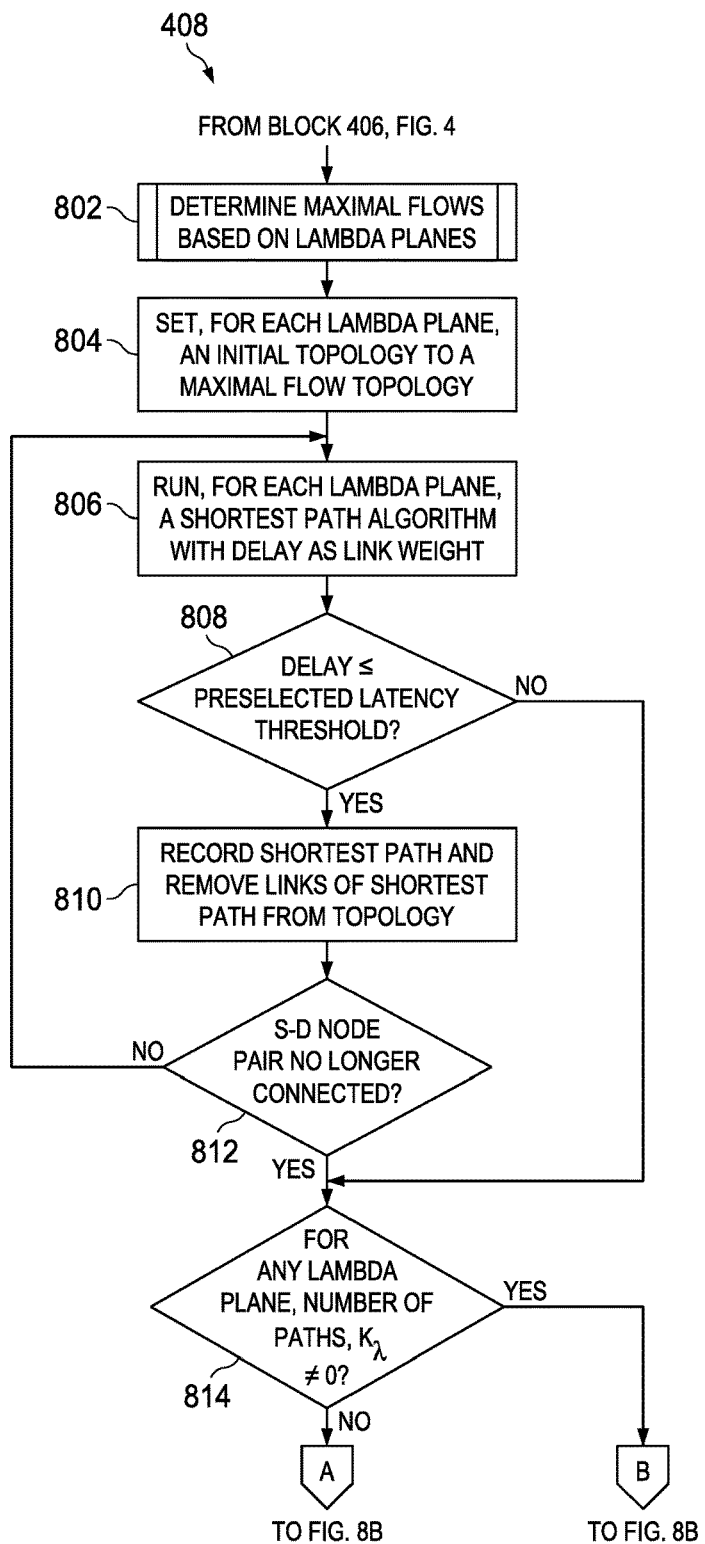
FIG. 8 (comprising sub-FIGS. 8A and 8B) is a flowchart of a portion of the method of FIG. 4 in further detail.
Figure 8B:
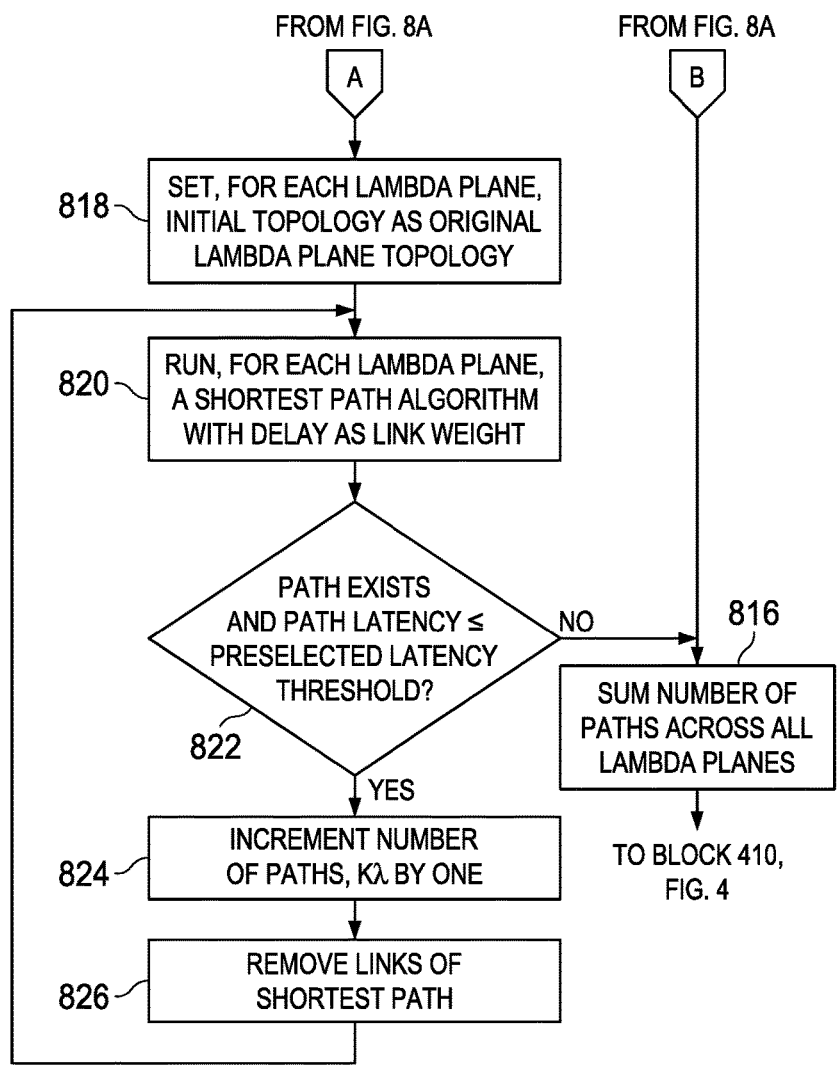

Before returning to the "No" branch of block 406, block 408 in FIG. 4 will be described in further detail in conjunction with the flowchart in FIG. 8 (comprising sub-figures 8A and 8B). In block 802, a maximal flow based on lambda planes is determined. Method 700 described in conjunction with FIG. 7 may be used at block 802. In block 804, an initial topology is set, for each lambda plane, to a maximal flow topology from block 802. For each lambda plane, a shortest path algorithm with delay as the link weight is run, in block 806. If, in block 808, a delay is less than a preselected latency threshold, block 808 exits by its "Yes" branch to block 810. In block 810, the shortest path is recorded and the links of the shortest path are removed from the topology. If, in block 812, a current S-D node pair is still connected, block 812 exits via its "No" branch to loop over lambda planes. Otherwise, block 812 exits via its "Yes" branch to block 814. Block 814 may also be entered if no delay satisfies the preselected latency threshold, via the "No" branch of block 808. If, in block 814, a recorded number of paths satisfying the preselected latency threshold, $K_\lambda$, is not zero for any lambda plane, block 814 exits via its "Yes" branch to block 816. In block 816, the number of paths, $K_\lambda$ is summed across lambda planes. Stated otherwise, the sum across all lambda planes of the number of paths recorded, $K_\lambda$, constitutes a maximum bandwidth satisfying a latency constraint comprising the preselected latency threshold. Block 408 proceeds to block 410 in FIG. 4 to report the maximal available bandwidth satisfying the preselected latency threshold.

Otherwise, in block 814, if there are no lambda planes with path delays satisfying the preselected latency threshold, block 814 exits via its "No" branch to block 818. In block 818, the initial topology is set to the original lambda plane topology for each lambda plane. A shortest path algorithm with delay as link weight is run for each lambda plane to determine a shortest latency path in block 820. If, in block 822, a shortest path exists, and the path latency is less than the preselected latency threshold, the block 822 exits via its "Yes" branch to block 824. In block 824, the number of paths satisfying the latency threshold for the lambda plane, $K_\lambda$, is incremented by one, and, in block 826, the links of the shortest path are removed from the topology and block 826 returns to block 820 to loop over lambda planes. Block 406 breaks out of the loop via the "No" branch at block 822 when the path no longer exists, i.e., the source-destination node pair are no longer connected, or the path latency exceeds the preselected latency threshold, and block 816 proceeds to block 410 in FIG. 4 to report the maximal available bandwidth satisfying the preselected latency threshold.

Returning to FIG. 4 at block 406, if paths to be reported are not latency constrained in block 406, block 406 proceeds by its "No" branch to block 414. In block 414 it is determined if the paths to be reported are based on a latency grid having a preselected grid spacing, T. In other words, a latency grid may be viewed as an index of path latencies spaced at a preselected interval T, and, if the number of paths, or equivalently, bandwidth, at each "point" of latency grid is to be reported, block proceeds by the "Yes" branch to block 416. The reporting based on a latency grid may, in at least some embodiments be in a request from an MDSC or, alternatively, specified by a policy. In block 416, it is determined, for each S-D node pair a maximum bandwidth at each point of the latency grid.

Figure 9:
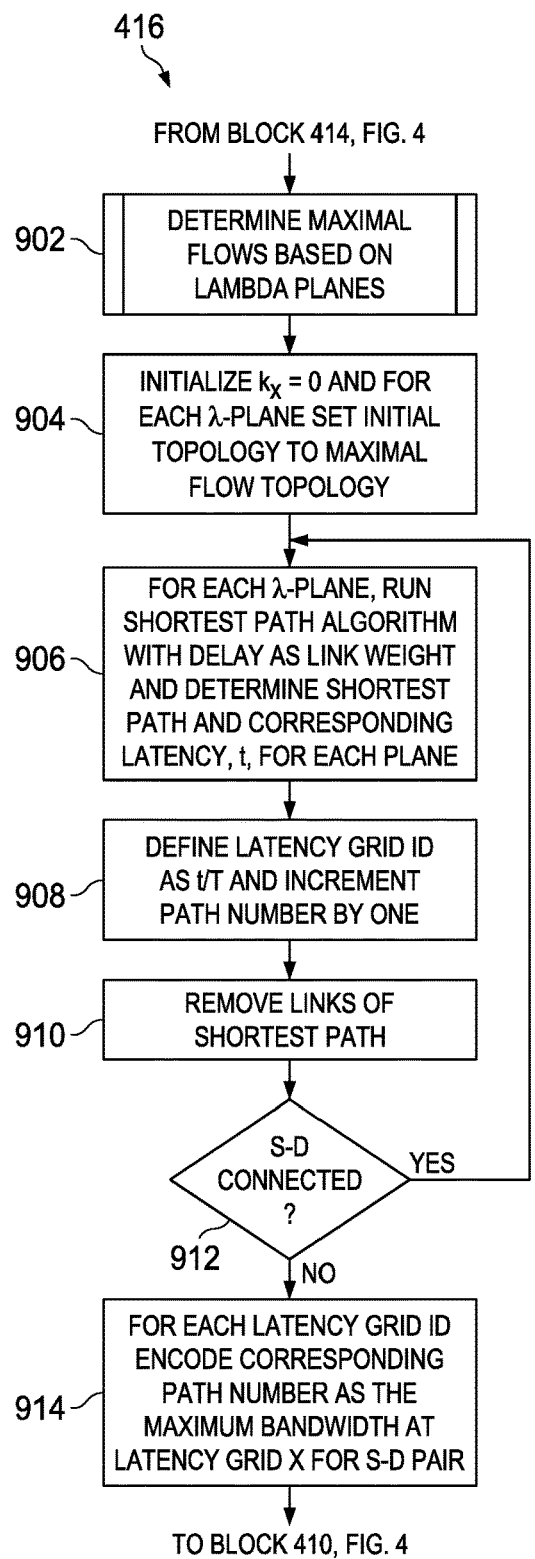
FIG. 9 is a flow chart of a portion of the method of FIG. 4 in further detail.

Before returning to the "Yes" branch of block 402, turn to FIG. 9 to consider block 416 in FIG. 4 in further detail. In block 902, maximal flows based on the lambda planes are determined. Method 700 described in conjunction with FIG. 7 may be used at block 902. In block 904, the number of paths whose latency locates between the points x*T and (x+1)*T in the latency grid, denoted $k_x$, is initialized to zero, and an initial topology for each lambda plane is set to the maximal flow topology. The number x is an index of points in the latency grid. Values of x that may be used in at least some embodiments are described below. For each lambda plane, a shortest path algorithm with delay as the link weight is run, and the shortest path and its corresponding latency, t, is determined, in block 906. In block 908, a latency grid ID is defined by t/T, which, in at least some embodiments may be used as the index x of the points of the latency grid. And the number of paths with the latency grid ID t/T, denoted by $k_{t/T}$, is incremented by one. In block 910, the links of the shortest path are removed. If, in block 912 the S-D node pair remains connected after removing the links at block 910, the method returns via the "Yes" branch to block 906 to continue to extract the latencies for each of the lambda planes. Once the S-D node pairs are no longer connected, block 912 exits the loop via the "No" branch to block 914. In block 914, for each latency grid point, x, the corresponding number of paths, $k_x$, is encoded as the maximum bandwidth at the grid point x, for the S-D node pair. The maximum bandwidths at each latency grid point are reported for the S-D node pair to an MDSC 114 in FIGS. 1 and 3 at block 410 in FIG. 4. The structure of a report that may be used in conjunction with block 410 in reporting the maximum bandwidths at latency grid points will be described below in conjunction with FIG. 13. After all reachable S-D node pairs have been reported, the loop over S-D node pairs exits via the "Yes" branch of block 411 in FIG. 4 and method 400 ends at block 412.

Figure 10:
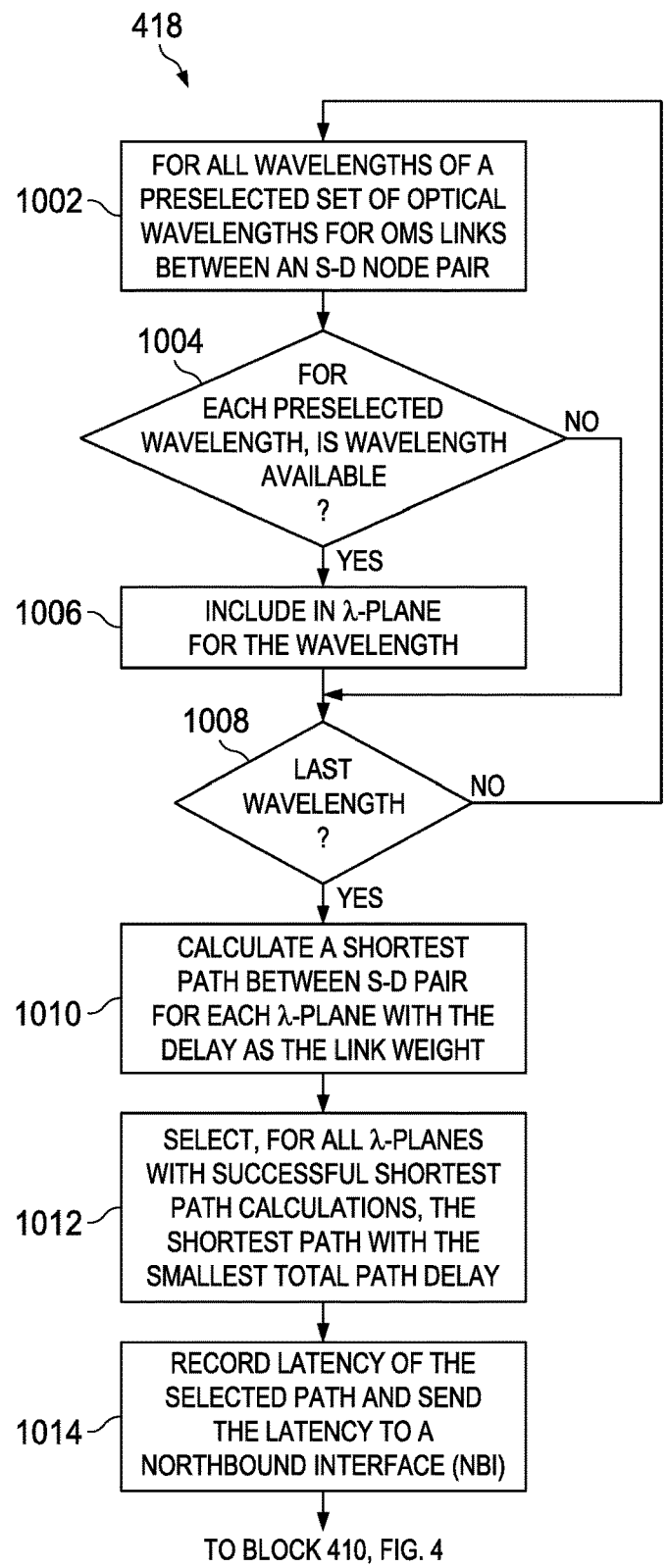
FIG. 10 is a flowchart of an embodiment of a method which can be used in conjunction with the method of FIG. 4.

Returning to FIG. 4 at block 402, if minimum latency paths are to be reported, block 402 falls through the "Yes" branch to block 418. In block 418, a minimum latency path is determined for each S-D pair. FIG. 10 shows block 418 in further detail. In block 1002, a loop is entered over a preselected set of optical wavelengths for OMS links between a S-D pair. In block 1004, it is determined if the wavelength is available for each preselected wavelength in the set. If the particular one of the preselected wavelengths is available, the OMS links are included in a lambda plane for the particular wavelength, in block 1006. A determination of the availability of all wavelengths of the set is made via a loop at block 1008 returning to block 1002 via its "No"

branch. If, in block 1008, when the availability of the last wavelength of the set has been determined and included in the corresponding lambda plane, block 1008 breaks out of the loop via its "Yes" branch to block 1010. In block 1010, a shortest path between the S-D node pair for each lambda plane is calculated with the delay as the link weight. In block 1012, for all lambda planes with successful shortest path calculation, the shortest path with the smallest total path delay is selected. In block 1014, the latency of the selected path is recorded and sent to an SDN controller NBI, e.g., an NBI 306 of an SDN controller 112 in FIG. 3. The latency for the S-D node pair is reported to an MDSC 114 in FIGS. 1 and 3 at block 410 in FIG. 4. The structure of reports that may be used in conjunction with block 410 will be described below in conjunction with FIGS. 12 and 13. After all reachable S-D node pairs have been reported, the loop over S-D node pairs exits via the "Yes" branch of block 411 and method 400 ends at block 412.

Figure 11:
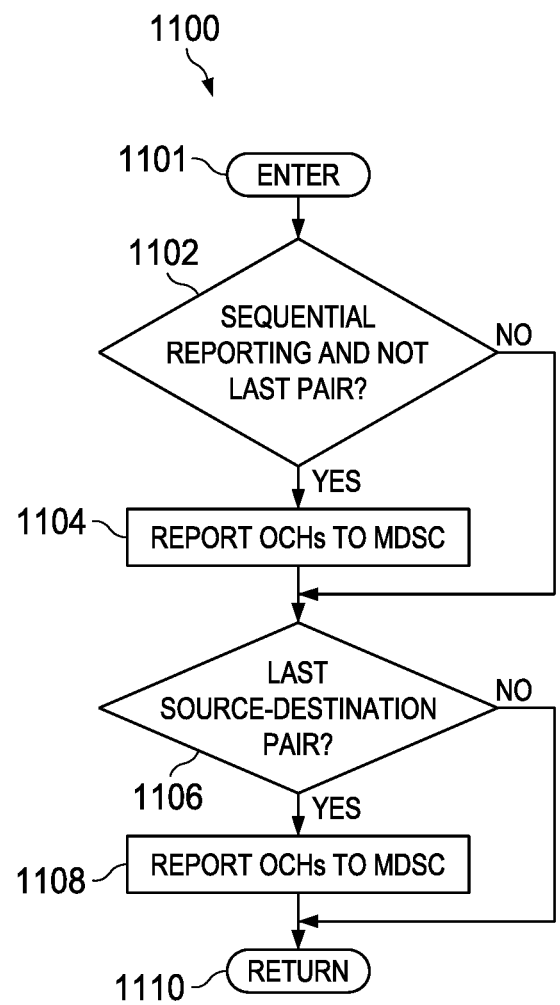
FIG. 11 is a flowchart of an embodiment of a method which can be used in conjunction with the method of FIG. 4.

In at least some embodiments of an SDN system 100 in FIGS. 1 and 3, the available paths may be reported incrementally, or sequentially, to an MDSC 114 in FIGS. 1 and 3. In an incremental update, the results for each S-D node pair are reported without waiting for the results for the other S-D node pairs. Alternatively, results may be reported in bulk after all of the available paths for all S-D node pairs have been determined. The alternatives may be selected based on a policy, for example. In FIG. 11, a flowchart of a method 1100 that may be used in conjunction with block 410 in FIG. 4 when paths are reported to an MDSC 114 is provided. In various example embodiments, method 1100 may be embodied as a callable software procedure, or as a hardware engine in an ASIC or a FPGA. Method 1100 is entered at block 1101. In block 1102 it is determined if available paths are to be reported sequentially, and if the S-D node pair is not a last S-D node pair. If both conditions are true, block 1102 falls through the "Yes" branch to block 1104, and the available OChs paths for the current S-D node pair are reported to the MDSC 114 in FIG. 3. The structure of a report that may be used in conjunction with block 1104 will be described below in conjunction with FIG. 12. Otherwise, block 1102 proceeds by the "No" branch to block 1106. In block 1106 it is determined if the current S-D node pair is the last S-D node pair for which available OCh paths are to be reported. If so, block 1106 proceeds via the "Yes" branch to block 1108 to report the available OCh paths for all S-D node pairs in bulk. The structure of a report that may be used in conjunction with block 1108 will also be described below in conjunction with FIG. 12. If the current S-D node pair is the last S-D node pair in block 1106, method 1100 returns at block 1110. Returning to FIG. 4, after all reachable S-D node pairs have been reported, the loop over S-D node pairs exits via the "Yes" branch of block 411 and method 400 ends at block 412.

Figure 12:
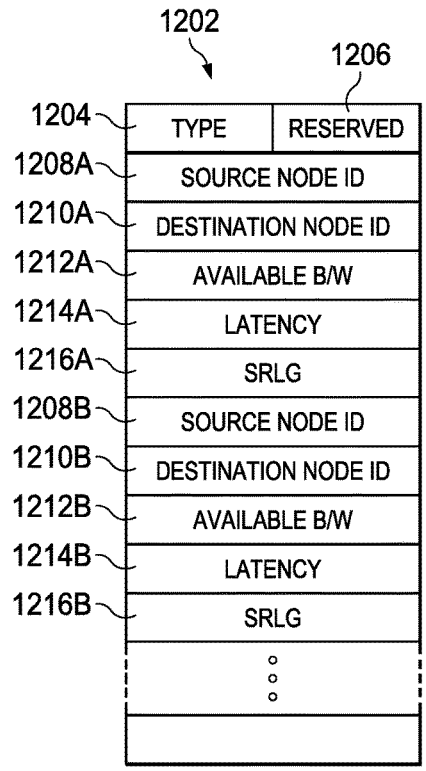
FIG. 12 shows embodiments of type-length-value (TLV) reporting structures.
Figure 12:
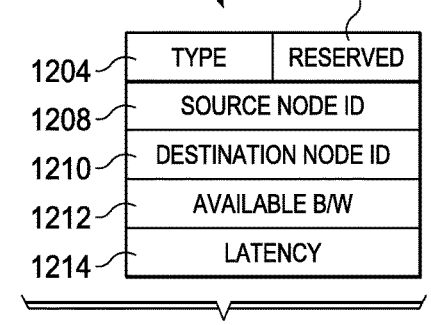

PCEP structures for reporting available paths will now be described in conjunction with FIGS. 12 and 13. FIG. 12 shows a PCEP reporting structure that may be used in at least some embodiments for reporting maximum available bandwidths for S-D node pairs as described in conjunction with FIG. 4 above. PCEP reporting structures may also be referred to as a type-length-value (TLV) structure. TLV structure 1202 is used in a bulk report, as described, for example at block 1108 in FIG. 11, and TLV structure 1203 is used in an incremental report as described at block 1104 in FIG. 11. TLV structure 1202 comprises a plurality of fields 1204-1216. Field 1204 includes a type value, which in at least some embodiments comprises a 16-bit value to identify the type of TLV. The type value may be assigned by the Internet Assigned Numbers Authority (IANA). Field 1206 is a reserved field, and is also 16-bits in length. Fields 1208 include a source node identifier (ID) which comprises a 32-bit value. Two instances of field 1208, fields 1208A and 1208B, are shown in the example TLV structure 1202 in FIG. 12, however, any number of fields 1208 may be included in such a TLV structure to accommodate all of the S-D node pairs for which available OCh paths are to be reported, as indicated by the dashed line. Fields 1210 include a destination node ID for the S-D node pair whose source node corresponds to the source node ID in the field 1208. A destination node ID comprises a 32-bit value in at least some embodiments. Corresponding to the two fields 1208A, 1208B, two fields 1210A and 1210B are shown. The available bandwidth (B/W) for the S-D node pair represented by the IDs in fields 1208 and 1210 is reported in field 1212 comprises a floating point value 32-bits in length. Corresponding to the two fields 1208A, 1208B, two fields 1212A and 1212B are shown. Each field 1214 includes a latency associated with the S-D path comprises a 32-bit integer value. Corresponding to the two fields 1208A, 1208B, two fields 1214A and 1214B are shown. Each field 1216 includes a shared risk link group (SRLG) number for the path. Corresponding to the two fields 1208A, 1208B, two fields 1216A and 1216B are shown. TLV structure 1203 includes fields 1204-1214 as described in conjunction with TLV structure 1202. However, only a single instance of each of the fields 1208, 1210, 1212 and 1214 is included representative of an incremental, or equivalently a sequential, reporting protocol.

Figure 13:
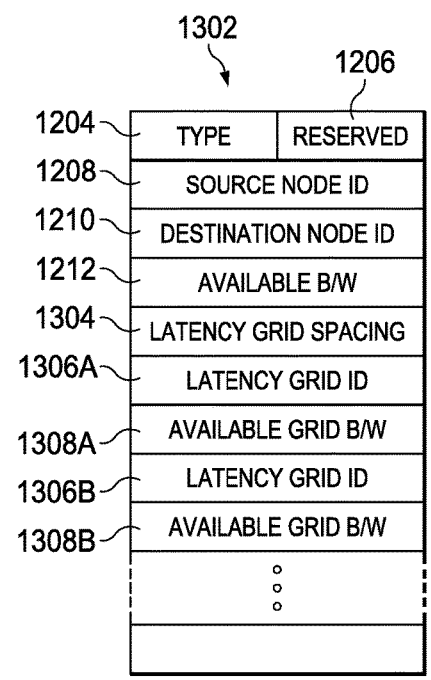
FIG. 13 shows an embodiment of a TLV reporting structure.

FIG. 13 shows a TLV structure 1302 which may be used in conjunction with a latency grid report as described above in conjunction with block 416 in FIG. 4. TLV structure 1302 includes fields 1204, 1208, 1210 and 1212 including, respectively a type value, a source node ID, a destination node ID and an available B/W, as described in conjunction with FIG. 12. Included is a reserved field 1206, also described above. The available B/W reported in field 1212 may represent the available B/W at all latency grids and comprises, in at least some embodiments, a 32-bit floating point value. A latency grid spacing, denoted T above, is included in field 1304. The latency grid spacing also comprises, in at least some embodiments, a 32-bit integer value representing the time spacing of a latency grid in milliseconds. Each field 1306 includes a latency grid ID as described above in conjunction with block 416 in FIG. 4 and comprises a 32-bit integer value. The available bandwidth at the respective latency grid ID is included in fields 1308, and comprises a 32-bit floating point value. In the example TLV structure 1302, two instances of fields 1306 and 1308, fields 1306A, 1306B and 1308A, 1308B are shown. However, as indicated by the dashed line, in general such a TLV structure may include any number of instances of fields 1306 and 1308 to accommodate a latency grid having a corresponding number of "points." The lengths of the various fields described above are by way of example, and alternative embodiments may have different field lengths.

Figure 14:
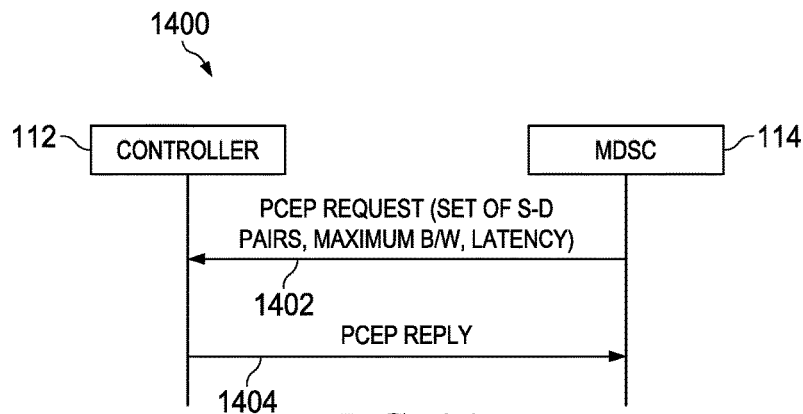
FIG. 14 is a ladder diagram of an embodiment of pull mode operations.
Figure 15:
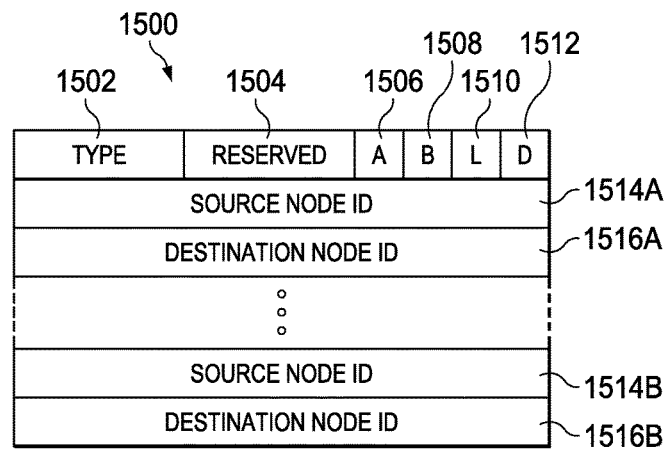
FIG. 15 shows an embodiment of a TLV request structure.
Figure 16:
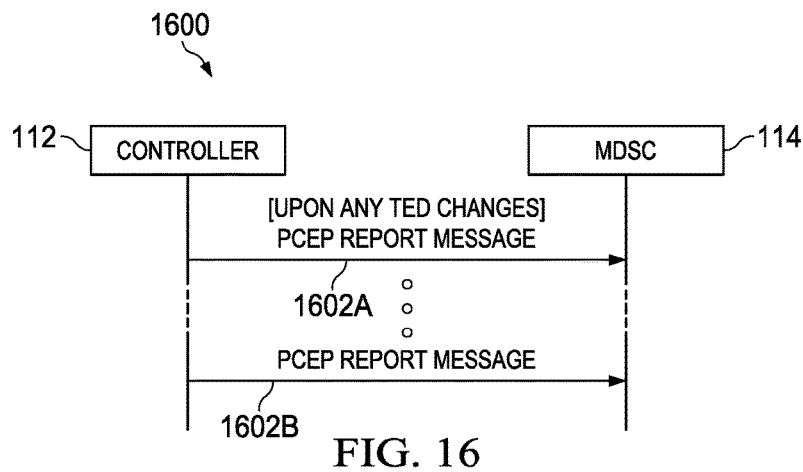
FIG. 16 is a ladder diagram of an embodiment of push mode operations.

In at least some embodiments, an SDN controller 112 in FIGS. 1 and 3 may report available OCh paths in response to a request from an MDSC 114 in FIGS. 1 and 3. This may be referred to a pull mode, and the request from the MDSC 114 may be referred to as a pull mode request. Alternatively, an SDN controller 112 in FIGS. 1 and 3 may report available OCh paths to an MDSC 114 in FIGS. 1 and 3 in response to an event, such as upon a change in the TED 302 in FIG. 3; this may be referred to as a push mode. FIG. 14 shows a ladder diagram for an example pull mode operation in accordance with at least some embodiments. FIGS. 15 and 16 show ladder diagrams for example push mode operations in accordance with at least some embodiments.

Referring now to FIG. 14, a ladder diagram for an example pull mode operation 1400 is shown. A sequence of actions comprising a pull mode operation 1400 is depicted from top to bottom in FIG. 14, and the entities participating in the actions depicted across the ladder diagram. As previously described, an MSDC 114 may need to compute an end-to-end path through a network between one or more S-D node pairs. Thus, an MDSC 114 may issue a PCEP request 1402 to an SDN controller 112. The PCEP request 1402 may include one or more parameters with respect to the OCh paths to be reported. For example, a PCEP request 1402 may include one or more of a set of S-D node pairs that are to be connected by the reported OCh paths, a maximum bandwidth request, a minimum latency request, or an abstracted topology request, which may, in at least some embodiments be implied, as described further in conjunction with FIG. 15, which shows an example TLV structure 1500 that may be used in conjunction with a PCEP request 1402 in FIG. 14. In response to a PCEP request 1402, an SDN controller 112 issues a PCEP reply 1404 to the MDSC 114. A PCEP reply 1404 comprises a TLV structure such as a TLV structure 1202 in FIG. 12.

Referring now to FIG. 15, TLV structure 1500 includes field 1502 comprising a type value which is a 16-bit integer value identifying the TLV structure 1500 as a PCEP request. The type value may be assigned by IANA. Field 1504 is reserved. Fields 1506, 1508, 1510 and 1512 are, in at least some embodiments, 1-bit flags. If the "A" flag is set, which may, for example be indicated by the value "1" in field 1506, then the request is for an abstracted topology. In at least some embodiments, the "A" flag may be omitted and the request for an abstracted topology implied from the type value. If the "B" flag is set, indicated by a "1" in field 1508 for example, then the request is for a maximum bandwidth path. If flag "L" is set, indicated by a "1" in field 1510, then the request is for a minimum latency path, and if the "D" flag is set, indicated by a "1" in field 1512, then the request is for a diverse path, for example, paths that do not share a physical link. Although in at least some embodiments, set flags may be represented by a value "1" in the corresponding fields, alternative embodiments may represent set flags by the value "0." Fields 1514A, 1514B and 1516A, 1516B include source and destination node IDs respectively, as described above in conjunction with FIG. 12, for example. As indicated by the dashed line, a TLV structure 1500 may include any number of field pairs 1514, 1516 corresponding to the number of S-D node pairs that an MDSC 114 in FIGS. 1, 3 and 14 needs to provision with connections.

Figure 17:
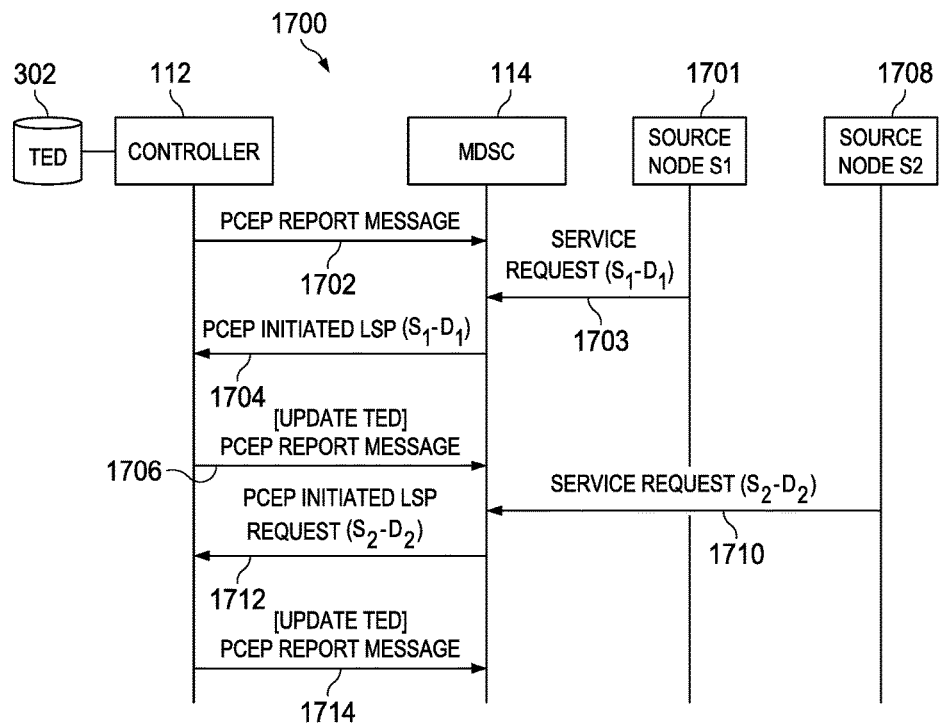
FIG. 17 is a ladder diagram of an embodiment of push mode operations.

Turning to push mode operations as exemplified in the ladder diagrams of push mode operations 1600 in FIGS. 16 and 1700 in FIG. 17, refer first to FIG. 16. Push mode operations 1600 is used in conjunction with bulk reporting of available OCh paths as described above in conjunction with block 410 in FIG. 4 and block 1108 in FIG. 11. In push mode operations 1600, upon a change in the TED, such as a TED 302 in FIG. 3, an SDN controller 112 sends PCEP report messages 1602A and 1602B to an MDSC 114. As indicated by the dashed line, any number of PCEP report messages 1602 may be sent incrementally based on the particular changes to the network as they have been reflected in the change in a TED. Thus, a PCEP report message 1602 may comprise a TLV structure 1203 in FIG. 12, for example. Referring now to FIG. 17, a ladder diagram of push mode operations 1700 in accordance with another embodiment of the disclosure is shown. In particular, push mode operations 1700 is based on incremental reporting as described above in conjunction with FIG. 11. Based on an initial instantiation of a TED 302, an SDN controller 112 sends a PCEP report message 1702 to an MDSC 114. PCEP report message 1702 may be a bulk report and comprise a TLV structure 1202 in FIG. 12, for example. Then, a source node 1701, labeled S1, sends a service request 1703 to the MDSC 114 requesting an end-end-path to a destination node, D1 (not shown in FIG. 17). S1-D1 define a first S-D node pair. MDCS 114 schedules the request and subsequently issues, to an SDN controller 112, a PCEP initiated LSP request 1704 to provision an end-to end path between the node pair S1-D1. SDN controller 112 maps the request into its RWA process to initiate the optical LSP provisioning, and the SDN controller 112 updates TED 302 accordingly. SDN controller 112 abstracts the updated network topology as described above, and sends a PCEP report message 1706 to MDSC 114. PCEP report message 1706 may, for example, be an incremental report message comprising a TLV structure 1203 in FIG. 12. Then, a second source node, 1708, labeled S2 sends a service request 1710 to MDSC 114 requesting an end-end-path to a destination node, D2 (not shown in FIG. 17). S2-D2 define a second S-D node pair. MDCS 114 schedules the request and issues a PCEP initiated LSP request 1712 to provision an end-to end path between the node pair S2-D2 to SDN controller 112. As before, SDN controller 112 maps the request into its RWA process to initiate the optical LSP provisioning, and the SDN controller 112 updates TED 302 accordingly. SDN controller 112 abstracts the updated network topology, and sends a PCEP report message 1714 to MDSC 114. PCEP report message 1714 may be an incremental report message similar to PCEP report message 1706.

Figure 18:
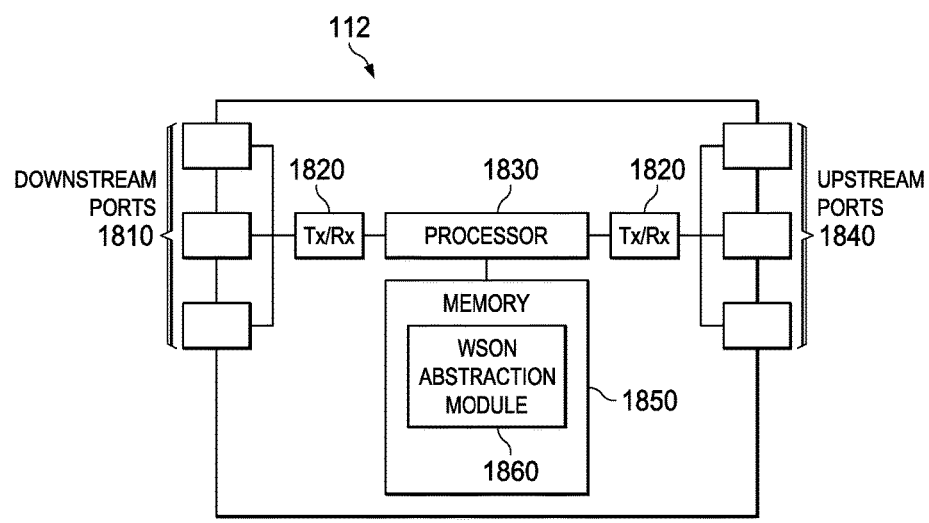
FIG. 18 is a block diagram of an embodiment of an SDN controller.

The features/methods of this disclosure may be implemented using hardware, firmware, and/or software installed to run on hardware. FIG. 18 is a block diagram of an embodiment of an SDN controller 112 that may be used to transport and process traffic through at least a portion of a network, such as optical network domain 106, shown in FIGS. 1 and 3. Other network components disclosed herein (e.g., MDSC, source node, destination node, etc.) may have a similar structure and include one or more similar components.

SDN controller 112 comprises one or more downstream ports 1810 coupled to a transceiver (Tx/Rx) 1820, which comprise transmitters, receivers, or combinations thereof. The Tx/Rx 1820 transmits and/or receives frames from other network nodes via the downstream ports 1810. For example, an SDN controller 112, in at least some embodiments connects to a TED 302 in FIG. 3 via a downstream port 1810. Similarly, SDN controller 112 comprises another Tx/Rx 1820 coupled to a plurality of upstream ports 1840, wherein the Tx/Rx 1820 transmits and/or receives frames from other nodes via the upstream ports 1840. In at least some embodiments, an NBI 306 in FIG. 3 comprises an upstream port 1840. The downstream ports 1810 and/or the upstream ports 1840 include electrical and/or optical transmitting and/or receiving components. The Tx/Rx 1820 transmits and/or receives data (e.g., packets) from other network elements, such as an MDSC 114 in FIGS. 1 and 3, via wired or optical connections, depending on the embodiment.

A processor 1830 is coupled to the Tx/Rx 1820 and is configured to process the frames and/or determine to which nodes to send (e.g., transmit) the packets. In an embodiment, the processor 1830 comprises one or more multi-core processors and/or memory modules 1850, which function as data stores, buffers, etc. The processor 1830 is implemented as a general processor or as part of one or more ASICs, FPGAs, and/or digital signal processors (DSPs). Although illustrated as a single processor, the processor 1830 is not so limited and may comprise multiple processors.

FIG. 18 illustrates that a memory module 1850 is coupled to the processor 1830 and is a non-transitory medium configured to store various types of data and/or instructions. Memory module 1850 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage is used to store programs which are loaded into the RAM when such programs are selected for execution. The ROM is used to store instructions and perhaps data that are read during program execution. The ROM is a non-volatile memory device which typically has a smaller memory capacity relative to the larger memory capacity of the secondary storage. The RAM is used to store volatile data and perhaps to store instructions. Access to both the ROM and RAM is typically faster than to the secondary storage.

The memory module 1850 is used to house the instructions for carrying out the various embodiments described herein. In one embodiment, the memory module 1850 comprises WSON abstraction module 1860 which is implemented via execution by the processor 1830. In an alternate embodiment, the processor 1830 comprises the WSON abstraction module 1860. In one embodiment, the WSON abstraction module 1860 is implemented according to embodiments of the present disclosure to perform WSON abstraction as described in conjunction with FIGS. 4-11, 14, 15 and 17.

Thus, by way of example, WSON abstraction module 1860, when executed by processor 1830 causes the processor to communicate to an MDSC such as MDSC 114 in FIGS. 1 and 3 via an NBI, e.g. NBI 306 in FIG. 3, an abstraction of a wavelength-switched optical network coupled to the SDN controller 112, e.g. optical network domain 106 in FIGS. 1 and 3. The WSON abstraction module 1860 when executed by the processor further causes the processor to generate the abstraction by, for example, determining a minimum latency OCh path between a source-destination node pair in response to a request from the MDSC; or determining a maximal number of available OCh paths between each reachable source-destination node pair; or determining a maximal number of OCh paths between each reachable source-destination node pair satisfying a preselected latency threshold condition, as the case may be, as described above in conjunction with blocks 404, 408 and 418 in FIG. 4. By way of further example, when determining the maximal number of OCh paths, the WSON abstraction module 1860 further causes the processor 1830 to determine, for all OMS links comprising a set of preselected optical wavelengths, if a wavelength of the set of preselected optical wavelengths is available for a source-destination node pair connection. If the wavelength is available, the processor further includes the OMS link in a lambda plane for the wavelength, and sums the number of OCh paths in each lambda plane across all lambda planes, wherein the maximal number of available OCh paths between each reachable source-destination node pair comprises the sum of the number of OCh paths, as described above in conjunction with block 404 in FIGS. 4 and 5, and FIG. 7. In addition, SDN controller 112 may comprise any other mechanism for implementing the WSON abstraction module 1860 such as a hardware engine either as a component of a processor 1830 or as a separate hardware block coupled to processor 1830, as would be appreciated by one skilled in the art upon review of this disclosure.

It is understood that by programming and/or loading executable instructions onto the SDN controller 112, at least one of the processors 1830, the cache, and the long-term storage are changed, transforming the processors 1830 in part into a particular machine or apparatus, for example, a multi-core forwarding architecture having the functionality comprising the principles of the disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that reflects the logical design of the instructions of the software. In the same manner as a machine controlled by a new ASIC is a particular machine or apparatus, likewise a computer that has been programmed and/or loaded with executable instructions may be viewed as a particular machine or apparatus.

Figure 19:
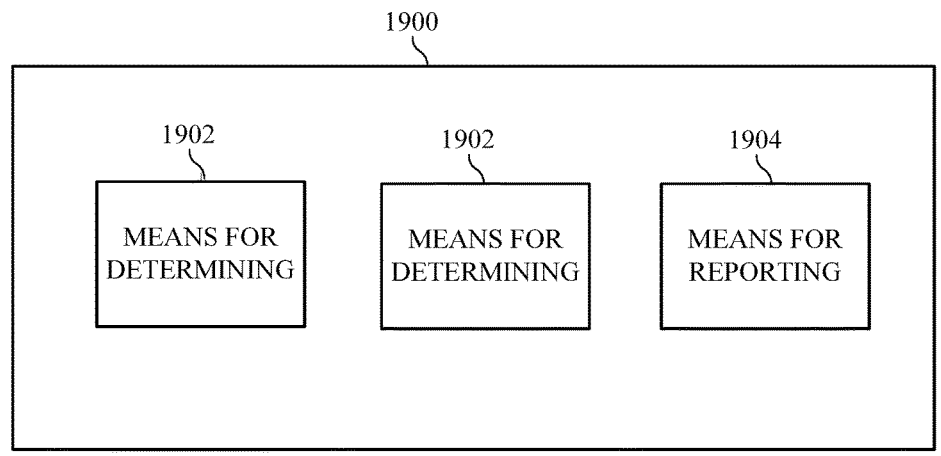
FIG. 19 is an apparatus configured to implement one of more of the methods disclosed herein.

FIG. 19 illustrates an apparatus 1900 configured to implement one or more of the methods described herein such as, for example, the method 400 of FIG. 4. Apparatus 1900 comprises means 1902 for determining a maximal number of available OCh paths for source-destination connections for each reachable source-destination node pairs, means 1904 for determining, if a preselected latency threshold is specified, a maximal number of OCh paths satisfying the preselected latency threshold, and means 1906 for reporting the available OCh paths to a service coordinator.

Figure 20:
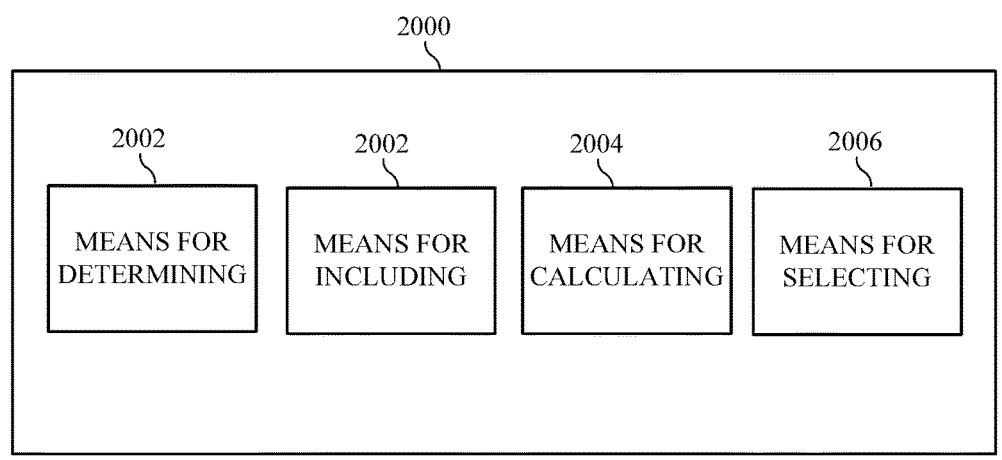
FIG. 20 is an apparatus configured to implement one of more of the methods disclosed herein

FIG. 20 illustrates an apparatus 2000 configured to implement one or more of the methods described herein such as, for example, the method 700 of FIG. 7. Apparatus 2000 includes means 2002 for determining, for all wavelengths of a preselected set of optical wavelengths for optical multiplex section (OMS) links, whether a wavelength of the set of preselected optical wavelengths is available for a source-destination node pair connection, means 2004 for including an OMS link in a lambda plane for the wavelength when the wavelength is available, means 2006 for calculating, using a shortest path algorithm with a delay as a link weight, a shortest path between a source-destination node pair for each lambda plane, and means 2008 for selecting, for all lambda planes with successful shortest path calculations, the shortest path with the smallest total path delay.

Additional aspects and embodiments of the invention are described below in relation to the clauses that follow.

Clause 1. A method comprising:

determining, for each reachable source-destination (S-D) node pair, a maximal number of optical channel (OCh) paths available for source-destination node pair connections;

determining, if a preselected latency threshold is specified, for all available OCh paths a maximal number of paths satisfying the preselected latency threshold; and reporting the available OCh paths to a service coordinator.

Clause 2. The method of clause 1, wherein determining, for each reachable source-destination node pair, a maximal number of OCh paths available for source-destination connections comprises:

determining, for all wavelengths of a preselected set of optical wavelengths for optical multiplex section (OMS) links, whether a wavelength of the set of preselected optical wavelengths is available for a source-destination node pair connection; and including an OMS link in a lambda plane for the wavelength when the wavelength is available.

Clause 3. The method of any one of clauses 1-2, further comprising determining a maximal flow between the source-destination node pair based on lambda planes.

Clause 4. The method of any one of clauses 1-3, further comprising calculating the maximal flow comprises summing the number of OCh paths in each lambda plane across all lambda planes, wherein the maximal flow for each lambda plane comprises a number of OCh paths in the lambda plane.

Clause 5. The method of any one of clauses 1-4, further comprising converting the maximal flow to a bandwidth equivalent coding.

Clause 6. The method of any one of clauses 1-5, further comprising sending the bandwidth equivalent coding to a northbound interface (NBI).

Clause 7. The method of any one of clauses 1-6, wherein reporting the available OCh paths further comprises:

determining a maximum number of OCh paths available for source-destination node connections for a current source-destination node pair; and reporting the maximum number to the MDSC when the reporting to the service coordinator is sequential.

Clause 8. The method of any one of clauses 1-7, wherein reporting the available OCh paths further comprises reporting the maximum number of OCh paths available for source-destination node connections for all reachable source-destination node pairs when the reporting is not sequential.

Clause 9. The method of any one of clauses 1-8, wherein the method is in response to a pull mode request from the service coordinator, and wherein the pull mode request comprises a specified set of source-destination node pairs.

Clause 10. The method of any one of clauses 1-9, wherein the method is in response to an update of a network topology maintained in a traffic engineering database (TED).

Clause 11. The method of any one of clauses 1-10, wherein, when the preselected latency threshold is specified, the determining comprises:

setting, for each lambda plane, an initial network topology as a maximal flow topology comprising the maximum number of OCh paths available for source-destination node pair connections;

determining, for each lambda plane, a shortest path based on a shortest-path algorithm with a delay as a link weight;

recording the shortest path when a shortest path length is less than or equal to the preselected latency threshold; and removing links of the shortest path from the maximum flow topology.

Clause 12. The method of any one of clauses 1-11, further comprising:

repeating the setting, determining, recording, and removing steps until the source-destination node pair is no longer connected; and summing a number of paths recorded across all lambda planes, wherein the sum constitutes a maximum bandwidth satisfying a latency constraint comprising the preselected latency threshold.

Clause 13. The method of any one of clauses 1-12, further comprising, when the number of paths is zero for each lambda plane, the following steps:

setting, for each lambda plane, the initial topology to an original lambda plane topology;

determining, for each lambda plane, the shortest path based on the shortest-path algorithm with the preselected latency threshold as a link weight to determine a shortest latency path;

incrementing, for each lambda plane when a length of the shortest path is less than the preselected latency threshold, a number of paths by one;

removing links on the shortest path; and repeating the determining, incrementing, and removing until the source-destination node pair are no longer connected or the latency of the shortest path is greater than the preselected latency threshold.

Clause 14. The method of any one of clauses 1-13, wherein the service coordinator is a Multi-Domain Service Coordinator (MDSC).

Clause 15. The method of any one of clauses 1-14, wherein a calculation for one of the reachable S-D node pairs does not affect a wavelength availability for another of the reachable S-D node pairs.

Clause 16. A method comprising determining, for all wavelengths of a preselected set of optical wavelengths for optical multiplex section (OMS) links, whether a wavelength of the set of preselected optical wavelengths is available for a source-destination node pair connection;

including an OMS link in a lambda plane for the wavelength when the wavelength is available; and calculating, using a shortest path algorithm with a delay as a link weight, a shortest path between a source-destination node pair for each lambda plane; and selecting, for all lambda planes with successful shortest path calculations, the shortest path with the smallest total path delay.

Clause 17. The method of clause 16, further comprising recording the latency of the selected path.

Clause 18. The method of any one of clauses 16-17, further comprising sending the recorded latency to a Northbound Interface (NBI) of a software defined network (SDN) controller.

Clause 19. The method of any one of clauses 16-18, wherein the recorded latency is send to the NBI in a predetermined field of a type-length-value (TLV) reporting structure.

Clause 20. The method of any one of clauses 16-19, wherein the recorded latency is sent in response to a pull mode request from a Multi-domain Service Coordinator (MDSC) communicatively coupled to the SDN controller via the NBI.

Clause 21. A software defined network (SDN) controller comprising:

a processor;

a Northbound Interface (NBI) coupled to the processor and comprising one or more ports configured to communicatively couple to a multi-domain Service Coordinator (MDSC);

a memory coupled to the processor and storing programming instructions comprising a wavelength-switched optical network (WSON) abstraction module, wherein the WSON abstraction module, when executed by the processor, causes the processor to:

communicate, to the MDSC via the NBI, an abstraction of a wavelength-switched optical network coupled to the SDN controller;

generate the abstraction by:

determining a minimum latency optical channel (OCh) path between a source-destination node pair in response to a request from the MDSC; or determining a maximal number of available OCh paths between each reachable source-destination node pair; or determining a maximal number of OCh paths between each reachable source-destination node pair satisfying a preselected latency threshold condition.

Clause 22. The SDN controller of clause 21, wherein the WSON abstraction module causes the processor to perform the following steps when determining a maximal number of available OCh paths between each reachable source-destination node pair:

determine, for all wavelengths of a preselected set of optical wavelengths for optical multiplex section (OMS) links, whether a wavelength of the set of preselected optical wavelengths is available for a source-destination node pair connection;

include an OMS link in a lambda plane for the wavelength when the wavelength is available; and sum the number of OCh paths in each lambda plane across all lambda planes, wherein the maximal number of available OCh paths between each reachable source-destination node pair comprises the sum of the number of OCh paths.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   determining how many optical channel (OCh) paths are available for border node pair connections;
   determining which of the OCh paths satisfy a preselected latency threshold; and
   reporting the OCh paths that satisfy the preselected latency threshold to a service coordinator that provided the preselected latency threshold,
   wherein the method is in response to a pull mode request from the service coordinator, the pull mode request comprising a specified set of border node pairs.

2. The method of claim 1, wherein determining how many OCh paths are available for border node pair connections comprises:
   determining, for all wavelengths of a preselected set of optical wavelengths for optical multiplex section (OMS) links, whether a wavelength of the set of preselected optical wavelengths is available for a border node pair connection; and
   including an OMS link in a lambda plane for the wavelength when the wavelength is available.

3. The method of claim 2, further comprising determining a maximal flow between a border node pair based on lambda planes.

4. The method of claim 3, further comprising calculating the maximal flow comprises summing the OCh paths in each lambda plane across all lambda planes,
   wherein the maximal flow for each lambda plane comprises a number of OCh paths in the lambda plane.

5. The method of claim 4, further comprising converting the maximal flow to a bandwidth equivalent coding.

6. The method of claim 5, further comprising sending the bandwidth equivalent coding to a northbound interface (NBI).

7. The method of claim 1, wherein reporting the OCh paths that satisfy the preselected latency threshold further comprises:
   determining a maximum number of OCh paths available for border node connections for a current border node pair; and
   reporting the maximum number to a multi-domain Service Coordinator (MDSC) when the reporting to the service coordinator is sequential.

8. The method of claim 7, wherein reporting the OCh paths further comprises reporting a maximum number of OCh paths available for border node connections for all reachable border node pairs when the reporting is not sequential.

9. The method of claim 1, wherein determining which of the OCh paths satisfy a preselected latency threshold comprises:
setting, for each lambda plane, an initial network topology as a maximal flow topology comprising the maximum number of OCh paths available for border node pair connections;
determining, for each lambda plane, a shortest path based on a shortest-path algorithm with a delay as a link weight;
recording the shortest path when a shortest path length is less than or equal to the preselected latency threshold; and
removing links of the shortest path from the maximal flow topology.

10. The method of claim 9, further comprising:
repeating the setting, determining, recording, and removing steps until a border node pair is no longer connected; and
summing a number of paths recorded across all lambda planes, wherein the sum constitutes a maximum bandwidth satisfying a latency constraint comprising the preselected latency threshold.

11. The method of claim 10, further comprising, when the number of paths is zero for each lambda plane, the following steps:
setting, for each lambda plane, the initial network topology to an original lambda plane topology;
determining, for each lambda plane, the shortest path based on the shortest-path algorithm with the preselected latency threshold as a link weight to determine a shortest latency path;
incrementing, for each lambda plane when a length of the shortest path is less than the preselected latency threshold, a number of paths by one;
removing links on the shortest path; and
repeating the determining, incrementing, and removing until the border node pair are no longer connected or a latency of the shortest path is greater than the preselected latency threshold.

12. The method of claim 1, wherein the service coordinator is a Multi-Domain Service Coordinator (MDSC).

13. The method of claim 1, wherein a calculation for one of the border node pairs that is reachable does not affect a wavelength availability for another of the border node pairs that is reachable.

14. A method comprising:
determining whether wavelengths from a set of preselected optical wavelengths for optical multiplex section (OMS) links are available for a border node pair connection;
including an OMS link in a lambda plane for the wavelengths when the wavelengths are available; and
calculating a shortest path between a border node pair for each lambda plane using a shortest path algorithm with a delay as a link weight;
selecting the shortest path with a smallest total path delay for each lambda plane having a shortest path calculation that was successful; and
removing links corresponding to the shortest path that was selected from a topology.

15. The method of claim 14, further comprising recording a latency of the shortest path that was selected.

16. The method of claim 15, further comprising sending the latency that was recorded to a Northbound Interface (NBI) of a software defined network (SDN) controller.

17. The method of claim 16, wherein the latency that was recorded is transmitted to the NBI in a type-length-value (TLV) field.

18. The method of claim 17, wherein the latency that was recorded is transmitted in response to a pull mode request from a Multi-domain Service Coordinator (MDSC) communicatively coupled to the SDN controller via the NBI.

19. A software defined network (SDN) controller configured to manage a wavelength-switched optical network, comprising:
a processor;
a Northbound Interface (NBI) coupled to the processor; and
a memory coupled to the processor and storing programming instructions comprising a wavelength-switched optical network (WSON) abstraction module, wherein the WSON abstraction module, when executed by the processor, causes the processor to:
communicate, to a multi-domain Service Coordinator (MDSC) via the NBI, an abstraction of a wavelength-switched optical network coupled to the SDN controller; and
generate the abstraction by determining a maximal number of OCh paths between each reachable border node pair satisfying a preselected latency threshold condition provided by the MDSC.

20. The SDN controller of claim 19, wherein the WSON abstraction module causes the processor to perform the following steps when determining a maximal number of available OCh paths between each reachable border node pair:
determine, for all wavelengths of a preselected set of optical wavelengths for optical multiplex section (OMS) links, whether a wavelength of the set of preselected optical wavelengths is available for a border node pair connection;
include an OMS link in a lambda plane for the wavelength when the wavelength is available; and
sum the number of OCh paths in each lambda plane across all lambda planes, wherein the maximal number of available OCh paths between each reachable border node pair comprises the sum of the number of OCh paths.

* * * * *